United States Patent
Lee et al.

(10) Patent No.: US 11,424,877 B2
(45) Date of Patent: Aug. 23, 2022

(54) APERIOD TRACKING REFERENCE SIGNAL

(71) Applicant: QUALCOMM Incorporated, San Diego, CA (US)

(72) Inventors: Heechoon Lee, San Diego, CA (US); Peter Pui Lok Ang, San Diego, CA (US); Jing Sun, San Diego, CA (US); Tao Luo, San Diego, CA (US); Peter Gaal, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 676 days.

(21) Appl. No.: 16/225,941

(22) Filed: Dec. 19, 2018

(65) Prior Publication Data
US 2019/0215117 A1 Jul. 11, 2019

Related U.S. Application Data

(60) Provisional application No. 62/615,063, filed on Jan. 9, 2018.

(51) Int. Cl.
*H04L 5/00* (2006.01)
(52) U.S. Cl.
CPC .......... *H04L 5/0048* (2013.01); *H04L 5/0007* (2013.01); *H04L 5/0051* (2013.01);
(Continued)
(58) Field of Classification Search
None
See application file for complete search history.

(56) References Cited

U.S. PATENT DOCUMENTS

2015/0030037 A1    1/2015 Ahn et al.
2020/0177254 A1*   6/2020 Lee .............. H04W 76/27
(Continued)

FOREIGN PATENT DOCUMENTS

WO    WO-2017221202 A1    12/2017

OTHER PUBLICATIONS

Mediatek Inc: "Summary of Offline Discussion on Bandwidth Part Operation", 3GPP Draft, R1-1716832, Summary of Offline Discussion on BWP Operation R2, 3rd Generation Partnership Project (3GPP), Mobile Competence Centre, 650, Route Des Lucioles, F-06921 Sophia-Antipolis Cedex, vol. RAN WG1, No. Nagoya, Japan, Sep. 18, 2017-Sep. 21, 2017, Sep. 20, 2017 (Sep. 20, 2017), XP051353894, 7 Pages, Retrieved from the Internet: URL:http://www.3gpp.org/ftp/tsg_ran/WG1_RL1/TSGR1_AH/NR_AH_1709/Docs/[retrieved on Sep. 20, 2017], p. 1-p. 3.

(Continued)

*Primary Examiner* — Robert M Morlan
(74) *Attorney, Agent, or Firm* — Qualcomm Incorporated

(57) ABSTRACT

Methods, systems, and devices for wireless communications are described. A base station may determine that a triggering event associated with a user equipment (UE) has occurred. The UE may receive, based at least in part on an occurrence of a triggering event associated with the UE, a trigger signal that identifies resources to be used for transmission of an aperiodic tracking reference signal (TRS). The UE may receive the aperiodic TRS based at least in part on the trigger signal and the identified resources. The UE may perform at least one of a tracking function, or a synchronization function, or an alignment function, or a combination thereof, in response to the occurrence of the triggering event and based at least in part on the aperiodic TRS.

48 Claims, 16 Drawing Sheets

(52) U.S. Cl.
CPC .......... *H04L 5/0078* (2013.01); *H04L 5/0082* (2013.01); *H04L 5/0085* (2013.01); *H04L 5/0094* (2013.01); *H04L 5/001* (2013.01); *H04L 5/0023* (2013.01); *H04L 5/0096* (2013.01)

(56) References Cited

U.S. PATENT DOCUMENTS

| | | | | |
|---|---|---|---|---|
| 2020/0205116 | A1* | 6/2020 | Zhang | H04L 1/203 |
| 2020/0221331 | A1* | 7/2020 | Kim | H04W 28/0268 |
| 2020/0287678 | A1* | 9/2020 | Li | H04L 5/0048 |
| 2021/0105111 | A1* | 4/2021 | Yoon | H04L 5/0048 |
| 2021/0167930 | A1* | 6/2021 | Jeon | H04L 27/2607 |

OTHER PUBLICATIONS

International Search Report and Written Opinion—PCT/US2018/066930—ISA/EPO—dated Apr. 11, 2019.
Mediatek Inc: "Remaining Details on Bandwidth Part Operation in NR," 3GPP Draft; R1-1718327_Remaining Details on Bandwidth Part Operation in NR, 3rd Generation Partnership Project (3GPP), Mobile Competence Centre; 650, Route Des Lucioles; F-06921 Sophia-Antipolis Ced, vol. RAN WG1, No. Prague, CZ; Oct. 9, 2017-Oct. 13, 2017, Oct. 8, 2017, XP051341510, 13 pages, Retrieved from the Internet: URL: http://www.3gpp.org/ftp/Meetings_3GPP_SYNC/RAN1/Docs/ [retrieved on Oct. 8, 2017].
Qualcomm, Ericsson: "WF on Aperiodic TRS," 3GPP Draft; R1-1721701_WF_Aperiodic_TRS, 3rd Generation Partnership Project (3GPP), Mobile Competence Centre; 650, Route Des Lucioles; F-06921 Sophia-Antipolis Cedex; France, vol. RAN WG1, No. Reno, NV, USA; Nov. 27, 2017-Dec. 1, 2017, Dec. 4, 2017, XP051370779, 3 Pages, Retrieved from the Internet: URL: http://www.3gpp.org/ftp/tsg%5Fran/WG1%5FRL1/TSGR1%5F91/Docs/ [retrieved on Dec. 4, 2017].
Qualcomm Incorporated: "Remaining Issues on TRS," 3GPP Draft; R1-1720671_TRS Open Issues, 3rd Generation Partnership Project (3GPP), Mobile Competence Centre; 650, Route Des Lucioles; F-06921 Sophia-Antipolis Cedex; France, vol. RAN WG1, No. Reno, NV, USA; Nov. 27, 2017-Dec. 1, 2017, Nov. 18, 2017, XP051370132, 6 pages, Retrieved from the Internet: URL: http://www.3gpp.org/ftp/tsg%5Fran/WG1%5FRL1/TSGR1%5F91/Docs/ [retrieved on Nov. 18, 2017].
Qualcomm Incorporated: "Remaining Issues on TRS," 3GPP Draft; R1-1800866, 3rd Generation Partnership Project (3GPP), Mobile Competence Centre; 650, Route Des Lucioles; F-06921 Sophia-Antipolis Cedex; France, vol. RAN WG1, No. Vancouver, Canada; Jan. 22, 2018-Jan. 26, 2018, Jan. 13, 2018, XP051385136, 4 Pages, Retrieved from the Internet: URL: http://www.3gpp.org/ftp/tsg%5Fran/WG1%5FRL1/TSGR1%5FAH/NR%5FAH%5F1801/Docs/ [retrieved on Jan. 13, 2018].
Xinwei: "Considerations on Beam Management for NR", 3GPP Draft; R1-166583 Considerations on Beam Management for NR, 3rd Generation Partnership Project (3GPP), Mobile Competence Centre; 650, Route Des Lucioles; F-06921 Sophia-Antipolis Cedex; France, vol. RAN WG1, No. Gothenburg, Sweden; Aug. 22, 2016-Aug. 26, 2016, Aug. 21, 2016 (Aug. 21, 2016), 6 Pages, XP051140289, Retrieved from the Internet: URL: http://www.3gpp.org/ftp/Meetings_3GPP_SYNC/RAN1/Docs/ [retrieved on Aug. 21, 2016].
Taiwan Search Report—TW107146138—TIPO—dated Jan. 8, 2022.

* cited by examiner

APERIOD TRACKING REFERENCE SIGNAL

CROSS REFERENCES

The present Application for Patent claims the benefit of U.S. Provisional Patent Application No. 62/615,063 by LEE, et al., entitled "APERIODIC TRACKING REFERENCE SIGNAL," filed Jan. 9, 2018, assigned to the assignee hereof, and expressly incorporated herein.

BACKGROUND

The following relates generally to wireless communication, and more specifically to aperiodic tracking reference signal (TRS).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Wireless communication systems may use reference signals for a variety of purposes, e.g., channel estimation, beam tracking, synchronization, and the like. Some wireless communication systems may use an always on reference signal configuration, e.g., a channel state information reference signal (CSI-RS), where the reference signal is transmitted in predefined resource elements (REs) during every slot, subframe, etc. Transmission of such always on reference signals may occur regardless of whether there are any ongoing wireless communications. While this may be acceptable in some scenarios, this approach comes with high costs in terms of time-frequency resources, channel occupancy time, reduced system throughput, waste, and the like.

To address such high costs, some wireless communication systems may use a periodic reference signal configuration. This approach may include using reference signals that, although not always on, are transmitted multiple times according to a periodic schedule, once activated. Generally, the periodic reference signals may be used for time/frequency tracking, Doppler/delay spread estimation, and the like, and may be configured using a configuration signal, such as a radio resource control (RRC) signal. One concern with this approach relates to what can be referred to as a cold start scenario where the periodic reference signals are not active, but there may be a need to tracking between the UE and base station. For example, periodic reference signals that are not activated (e.g., being transmitted) results in the UE and base station being out of synchronization, at least to some degree. That is, with no always on reference signals or periodic reference signals being transmitted, the UE and base station may become partially out of synchronization due to UE mobility, time/frequency shift, etc. In some examples, the wireless communication system may simply be asynchronous in that there is little or no synchronization between the UE and base station outside of ongoing communications. Regardless of the cause of the loss of synchronization, a triggering event (e.g., a cold start event) may occur that may result in a need for the UE and base station to be aligned to a certain degree. The triggering event may be a periodic event (e.g., an event that occurs according to a schedule only when the triggering event occurs) or aperiodic (e.g., an event that occurs dynamically or as needed).

SUMMARY

The described techniques relate to improved methods, systems, devices, or apparatuses that support aperiodic tracking reference signal (TRS), such as a channel state information reference signal (CSI-RS) for tracking. Generally, the described techniques provide for transmission of an aperiodic TRS in response to occurrence of a triggering event at the user equipment (UE). In some aspects, the resources that can be used for the aperiodic TRS may be indicated in a trigger signal that is transmitted to the UE, e.g., in a downlink control indicator (DCI), in a medium access control (MAC) control element (CE), and the like. In other aspects, the base station may preconfigure the UE with an indication of the aperiodic TRS resources and then the triggering event may serve as the trigger for the aperiodic TRS. In some aspects, the triggering event may be considered a cold start case in that the event occurs aperiodically, dynamically, etc.

Thus, in some aspects the base station and UE may determine that the triggering event has occurred. Example triggering events may include, but are not limited to, a secondary cell (SCell) being activated/deactivated, a change in bandwidth part (BWP), a beam change (e.g., a change in the physical downlink shared channel (PDSCH) beam), a paging occasion, and the like. In response to the triggering event occurring, the base station may transmit a trigger signal to the UE that identifies some or all of the resources to be used for transmission of the aperiodic TRS. For example, the trigger signal may indicate the actual time and/or frequency resources that will be used for transmission of the aperiodic TRS and/or the trigger signal may provide an indication of the triggering event (e.g., a SCell activation/deactivation indication) and the resources for the aperiodic TRS may be based on that indication. The base station may then transmit (and the UE may receive) the aperiodic TRS using the resource(s) identified or otherwise indicated in the trigger signal. The UE and base station may use the aperiodic TRS for time and/or frequency tracking, Doppler/delay spread determination, and the like.

In other aspects, the resource(s) associated with the aperiodic TRS may be preconfigured. For example, the base station may transmit a configuration signal (such as a radio resource control (RRC) signal) to the UE that identifies time and/or frequency resources that will be used for transmission of the aperiodic TRS whenever a triggering event occurs. As one non-limiting example, the configuration signal may provide a transmission timing parameter indicating when the aperiodic TRS will be transmitted with respect to the triggering event occurrence. Accordingly, the UE and base station may detect or otherwise determine that a triggering event has occurred and the base station may transmit the aperiodic TRS in response to the triggering event and based on the configuration signal.

A method of wireless communication is described. The method may include determining that a triggering event associated with a UE has occurred, transmitting, based at least in part on the determining, a trigger signal that identifies resources to be used for transmission of an aperiodic TRS, and transmitting the aperiodic TRS based at least in part on the trigger signal and the identified resources.

An apparatus for wireless communication is described. The apparatus may include means for determining that a triggering event associated with a UE has occurred, means for transmitting, based at least in part on the determining, a trigger signal that identifies resources to be used for transmission of an aperiodic TRS, and means for transmitting the aperiodic TRS based at least in part on the trigger signal and the identified resources.

Another apparatus for wireless communication is described. The apparatus may include a processor, memory in electronic communication with the processor, and instructions stored in the memory. The instructions may be operable to cause the processor to determine that a triggering event associated with a UE has occurred, transmit, based at least in part on the determining, a trigger signal that identifies resources to be used for transmission of an aperiodic TRS, and transmit the aperiodic TRS based at least in part on the trigger signal and the identified resources.

A non-transitory computer-readable medium for wireless communication is described. The non-transitory computer-readable medium may include instructions operable to cause a processor to determine that a triggering event associated with a UE has occurred, transmit, based at least in part on the determining, a trigger signal that identifies resources to be used for transmission of an aperiodic TRS, and transmit the aperiodic TRS based at least in part on the trigger signal and the identified resources.

In some examples of the method, apparatus, and non-transitory computer-readable medium described above, the trigger signal may be transmitted in a DCI.

In some examples of the method, apparatus, and non-transitory computer-readable medium described above, the trigger signal indicates at least one of a field indicating that the aperiodic TRS may be triggered or a field indicating the triggering event, wherein the indication of the triggering event comprises the indication that the aperiodic TRS may be triggered.

Some examples of the method, apparatus, and non-transitory computer-readable medium described above may further include processes, features, means, or instructions for performing a synchronization signal block (SSB) transmission prior to the triggering event occurring, the SSB transmission indicating at least a portion of information associated with the triggering event.

In some examples of the method, apparatus, and non-transitory computer-readable medium described above, the triggering event comprises at least one of a secondary cell activation event, or a bandwidth part switching event, or a beam change event, or a connected mode discontinuous reception event, or an idle mode discontinuous reception event, or a combination thereof.

Some examples of the method, apparatus, and non-transitory computer-readable medium described above may further include processes, features, means, or instructions for transmitting an uplink DCI that identifies the resources to be used for the aperiodic TRS.

Some examples of the method, apparatus, and non-transitory computer-readable medium described above may further include processes, features, means, or instructions for configuring the uplink DCI to identify additional resources to be used for transmission of a channel state information reference signal.

Some examples of the method, apparatus, and non-transitory computer-readable medium described above may further include processes, features, means, or instructions for transmitting a downlink DCI that identifies the resources to be used for the aperiodic TRS.

Some examples of the method, apparatus, and non-transitory computer-readable medium described above may further include processes, features, means, or instructions for configuring bits of a downlink grant field of the downlink DCI to indicate a zero grant or invalid grant. Some examples of the method, apparatus, and non-transitory computer-readable medium described above may further include processes, features, means, or instructions for configuring bits of a second field to indicate that the aperiodic TRS may have been triggered, the second field being different from the downlink grant field.

In some examples of the method, apparatus, and non-transitory computer-readable medium described above, the configured bits of the second field indicate that the triggering event may have occurred, and the indication of the triggering event further indicates that the aperiodic TRS may be triggered.

Some examples of the method, apparatus, and non-transitory computer-readable medium described above may further include processes, features, means, or instructions for transmitting the DCI in a same slot as the aperiodic TRS may be transmitted in.

Some examples of the method, apparatus, and non-transitory computer-readable medium described above may further include processes, features, means, or instructions for transmitting the DCI in a different slot from slot that the aperiodic TRS may be transmitted in.

In some examples of the method, apparatus, and non-transitory computer-readable medium described above, the DCI comprises at least one of a fallback DCI format or a non-fallback DCI format.

In some examples of the method, apparatus, and non-transitory computer-readable medium described above, the DCI comprises an indication of a transmission timing parameter associated with the aperiodic TRS.

In some examples of the method, apparatus, and non-transitory computer-readable medium described above, the trigger signal may be transmitted in a medium access control (MAC) control element (CE).

Some examples of the method, apparatus, and non-transitory computer-readable medium described above may further include processes, features, means, or instructions for configuring the MAC CE to indicate that a secondary cell may have been activated.

In some examples of the method, apparatus, and non-transitory computer-readable medium described above, the aperiodic TRS may be transmitted a defined waiting period after the MAC CE.

Some examples of the method, apparatus, and non-transitory computer-readable medium described above may further include processes, features, means, or instructions for configuring the MAC CE to indicate that a beam change event may have occurred.

In some examples of the method, apparatus, and non-transitory computer-readable medium described above, triggering event comprises at least one of a secondary cell activation event, or a bandwidth part switching event, or a beam change event, or a connected mode discontinuous reception event, or an idle mode discontinuous reception event, or a combination thereof.

In some examples of the method, apparatus, and non-transitory computer-readable medium described above, the aperiodic TRS comprises a channel state information reference signal (CSI-RS) for tracking.

A method of wireless communication is described. The method may include determining that a triggering event associated with the UE has occurred, receiving, based at least in part on the determining, a trigger signal that identifies resources to be used for transmission of an aperiodic TRS, and receiving the aperiodic TRS based at least in part on the trigger signal and the identified resources.

An apparatus for wireless communication is described. The apparatus may include means for determining that a triggering event associated with the UE has occurred, means for receiving, based at least in part on the determining, a trigger signal that identifies resources to be used for transmission of an aperiodic TRS, and means for receiving the aperiodic TRS based at least in part on the trigger signal and the identified resources.

Another apparatus for wireless communication is described. The apparatus may include a processor, memory in electronic communication with the processor, and instructions stored in the memory. The instructions may be operable to cause the processor to determine that a triggering event associated with the UE has occurred, receive, based at least in part on the determining, a trigger signal that identifies resources to be used for transmission of an aperiodic TRS, and receive the aperiodic TRS based at least in part on the trigger signal and the identified resources.

A non-transitory computer-readable medium for wireless communication is described. The non-transitory computer-readable medium may include instructions operable to cause a processor to determine that a triggering event associated with the UE has occurred, receive, based at least in part on the determining, a trigger signal that identifies resources to be used for transmission of an aperiodic TRS, and receive the aperiodic TRS based at least in part on the trigger signal and the identified resources.

In some examples of the method, apparatus, and non-transitory computer-readable medium described above, the trigger signal may be received in a DCI.

In some examples of the method, apparatus, and non-transitory computer-readable medium described above, the trigger signal indicates at least one of a field indicating that the aperiodic TRS may be triggered or a field indicating the triggering event, wherein the indication of the triggering event comprises the indication that the aperiodic TRS may be triggered.

In some examples of the method, apparatus, and non-transitory computer-readable medium described above, the triggering event comprises at least one of a secondary cell activation event, or a bandwidth part switching event, or a beam change event, or a connected mode discontinuous reception event, or an idle mode discontinuous reception event, or a combination thereof.

Some examples of the method, apparatus, and non-transitory computer-readable medium described above may further include processes, features, means, or instructions for receiving a SSB transmission prior to the triggering event occurring, the SSB transmission indicating at least a portion of information associated with the triggering event.

Some examples of the method, apparatus, and non-transitory computer-readable medium described above may further include processes, features, means, or instructions for receiving an uplink DCI that identifies the resources to be used for the aperiodic TRS.

Some examples of the method, apparatus, and non-transitory computer-readable medium described above may further include processes, features, means, or instructions for decoding the uplink DCI to identify additional resources to be used for transmission of a channel state information reference signal.

Some examples of the method, apparatus, and non-transitory computer-readable medium described above may further include processes, features, means, or instructions for receiving a downlink DCI that identifies the resources to be used for the aperiodic TRS.

Some examples of the method, apparatus, and non-transitory computer-readable medium described above may further include processes, features, means, or instructions for decoding bits of a downlink grant field of the downlink DCI to identify a zero grant or invalid grant. Some examples of the method, apparatus, and non-transitory computer-readable medium described above may further include processes, features, means, or instructions for decoding bits of a second field to identify the indication that the aperiodic TRS may have been triggered, the second field being different from the downlink grant field.

In some examples of the method, apparatus, and non-transitory computer-readable medium described above, the configured bits of the second field indicates that the triggering event may have occurred, and the indication of the triggering event further indicates that the aperiodic TRS may be triggered.

Some examples of the method, apparatus, and non-transitory computer-readable medium described above may further include processes, features, means, or instructions for receiving the DCI in a same slot as the aperiodic TRS may be received in.

Some examples of the method, apparatus, and non-transitory computer-readable medium described above may further include processes, features, means, or instructions for receiving the DCI in a different slot from slot that the aperiodic TRS may be received in.

In some examples of the method, apparatus, and non-transitory computer-readable medium described above, the DCI comprises at least one of a fallback DCI format or a non-fallback DCI format.

In some examples of the method, apparatus, and non-transitory computer-readable medium described above, the DCI comprises an indication of a transmission timing parameter associated with the aperiodic TRS.

In some examples of the method, apparatus, and non-transitory computer-readable medium described above, the trigger signal may be received in a MAC CE.

Some examples of the method, apparatus, and non-transitory computer-readable medium described above may further include processes, features, means, or instructions for determining that a secondary cell may have been activated based at least in part on the MAC CE.

In some examples of the method, apparatus, and non-transitory computer-readable medium described above, the aperiodic TRS may be received a defined waiting period after the MAC CE.

Some examples of the method, apparatus, and non-transitory computer-readable medium described above may further include processes, features, means, or instructions for determining that a beam change event may have occurred based at least in part on the MAC CE.

In some examples of the method, apparatus, and non-transitory computer-readable medium described above, the triggering event comprises at least one of a secondary cell activation event, or a bandwidth part switching event, or a beam change event, or a connected mode discontinuous reception event, or an idle mode discontinuous reception event, or a combination thereof.

In some examples of the method, apparatus, and non-transitory computer-readable medium described above, the aperiodic TRS comprises a CSI-RS for tracking.

A method of wireless communication is described. The method may include transmitting a configuration signal to a UE, the configuration signal identifying a transmission timing parameter for transmission of an aperiodic TRS, determining that a triggering event associated with the UE has occurred, and transmitting the aperiodic TRS to the UE based at least in part on the determining and according to the transmission timing parameter.

An apparatus for wireless communication is described. The apparatus may include means for transmitting a configuration signal to a UE, the configuration signal identifying a transmission timing parameter for transmission of an aperiodic TRS, means for determining that a triggering event associated with the UE has occurred, and means for transmitting the aperiodic TRS to the UE based at least in part on the determining and according to the transmission timing parameter.

Another apparatus for wireless communication is described. The apparatus may include a processor, memory in electronic communication with the processor, and instructions stored in the memory. The instructions may be operable to cause the processor to transmit a configuration signal to a UE, the configuration signal identifying a transmission timing parameter for transmission of an aperiodic TRS, determine that a triggering event associated with the UE has occurred, and transmit the aperiodic TRS to the UE based at least in part on the determining and according to the transmission timing parameter.

A non-transitory computer-readable medium for wireless communication is described. The non-transitory computer-readable medium may include instructions operable to cause a processor to transmit a configuration signal to a UE, the configuration signal identifying a transmission timing parameter for transmission of an aperiodic TRS, determine that a triggering event associated with the UE has occurred, and transmit the aperiodic TRS to the UE based at least in part on the determining and according to the transmission timing parameter.

Some examples of the method, apparatus, and non-transitory computer-readable medium described above may further include processes, features, means, or instructions for identifying a paging occasion for the UE while the UE may be operating in an idle mode discontinuous reception state, wherein the paging occasion comprises the triggering event.

Some examples of the method, apparatus, and non-transitory computer-readable medium described above may further include processes, features, means, or instructions for determining that data may be to be communicated to the UE while the UE may be operating in a connected mode discontinuous reception state. Some examples of the method, apparatus, and non-transitory computer-readable medium described above may further include processes, features, means, or instructions for identifying an on period where the UE wakes from the discontinuous reception state. Some examples of the method, apparatus, and non-transitory computer-readable medium described above may further include processes, features, means, or instructions for transmitting the aperiodic TRS prior to or during the on period according to the transmission timing parameter.

In some examples of the method, apparatus, and non-transitory computer-readable medium described above, the transmission timing parameter comprises a relative timing parameter for transmission of the aperiodic TRS after occurrence of the triggering event.

In some examples of the method, apparatus, and non-transitory computer-readable medium described above, the triggering event comprises at least one of a secondary cell activation event, or a bandwidth part switching event, or a beam change event, or a connected mode discontinuous reception event, or an idle mode discontinuous reception event, or a combination thereof.

A method of wireless communication is described. The method may include receiving a configuration signal that identifies a transmission timing parameter for transmission of an aperiodic TRS, determining that a triggering event associated with the UE has occurred, and receiving the aperiodic TRS based at least in part on the determining and according to the transmission timing parameter.

An apparatus for wireless communication is described. The apparatus may include means for receiving a configuration signal that identifies a transmission timing parameter for transmission of an aperiodic TRS, means for determining that a triggering event associated with the UE has occurred, and means for receiving the aperiodic TRS based at least in part on the determining and according to the transmission timing parameter.

Another apparatus for wireless communication is described. The apparatus may include a processor, memory in electronic communication with the processor, and instructions stored in the memory. The instructions may be operable to cause the processor to receive a configuration signal that identifies a transmission timing parameter for transmission of an aperiodic TRS, determine that a triggering event associated with the UE has occurred, and receive the aperiodic TRS based at least in part on the determining and according to the transmission timing parameter.

A non-transitory computer-readable medium for wireless communication is described. The non-transitory computer-readable medium may include instructions operable to cause a processor to receive a configuration signal that identifies a transmission timing parameter for transmission of an aperiodic TRS, determine that a triggering event associated with the UE has occurred, and receive the aperiodic TRS based at least in part on the determining and according to the transmission timing parameter.

Some examples of the method, apparatus, and non-transitory computer-readable medium described above may further include processes, features, means, or instructions for receiving the aperiodic TRS during a paging occasion for the UE while the UE may be operating in an idle mode discontinuous reception state, wherein occurrence of the paging occasion comprises the triggering event.

Some examples of the method, apparatus, and non-transitory computer-readable medium described above may further include processes, features, means, or instructions for receiving the aperiodic TRS before an on duration of a connected mode discontinuous reception state. Some examples of the method, apparatus, and non-transitory computer-readable medium described above may further include processes, features, means, or instructions for determining, based at least in part on receiving the aperiodic TRS, that data may be to be communicated to the UE. Some examples of the method, apparatus, and non-transitory computer-readable medium described above may further include processes, features, means, or instructions for transitioning to an active state from the discontinuous reception state for the data communication.

In some examples of the method, apparatus, and non-transitory computer-readable medium described above, the transmission timing parameter comprises a relative timing parameter for transmission of the aperiodic TRS after occurrence of the triggering event.

In some examples of the method, apparatus, and non-transitory computer-readable medium described above, the triggering event comprises at least one of a secondary cell activation event, or a bandwidth part switching event, or a beam change event, or a connected mode discontinuous reception event, or an idle mode discontinuous reception event, or a combination thereof.

A method of wireless communication at a UE is described. The method may include receiving, based on an occurrence of a triggering event associated with the UE, a trigger signal that identifies resources to be used for transmission of an aperiodic TRS, receiving the aperiodic TRS based on the trigger signal and the identified resources, and performing at least one of a tracking function, or a synchronization function, or an alignment function, or a combination thereof, in response to the occurrence of the triggering event and based on the aperiodic TRS.

An apparatus for wireless communication at a UE is described. The apparatus may include a processor, memory in electronic communication with the processor, and instructions stored in the memory. The instructions may be executable by the processor to cause the apparatus to receive, based on an occurrence of a triggering event associated with the UE, a trigger signal that identifies resources to be used for transmission of an aperiodic TRS, receive the aperiodic TRS based on the trigger signal and the identified resources, and perform at least one of a tracking function, or a synchronization function, or an alignment function, or a combination thereof, in response to the occurrence of the triggering event and based on the aperiodic TRS.

Another apparatus for wireless communication at a UE is described. The apparatus may include means for receiving, based on an occurrence of a triggering event associated with the UE, a trigger signal that identifies resources to be used for transmission of an aperiodic TRS, receiving the aperiodic TRS based on the trigger signal and the identified resources, and performing at least one of a tracking function, or a synchronization function, or an alignment function, or a combination thereof, in response to the occurrence of the triggering event and based on the aperiodic TRS.

A non-transitory computer-readable medium storing code for wireless communication at a UE is described. The code may include instructions executable by a processor to receive, based on an occurrence of a triggering event associated with the UE, a trigger signal that identifies resources to be used for transmission of an aperiodic TRS, receive the aperiodic TRS based on the trigger signal and the identified resources, and perform at least one of a tracking function, or a synchronization function, or an alignment function, or a combination thereof, in response to the occurrence of the triggering event and based on the aperiodic TRS.

In some examples of the method, apparatuses, and non-transitory computer-readable medium described herein, the aperiodic TRS includes a CSI-RS for tracking that may be separate from an aperiodic CSI-RS used for channel estimation.

In some examples of the method, apparatuses, and non-transitory computer-readable medium described herein, the trigger signal may be received in a DCI.

In some examples of the method, apparatuses, and non-transitory computer-readable medium described herein, the trigger signal carries at least one of a field indicating that the aperiodic TRS may be triggered or a field indicating the triggering event, where the indication of the triggering event includes the indication that the aperiodic TRS may be triggered.

In some examples of the method, apparatuses, and non-transitory computer-readable medium described herein, the triggering event includes at least one of a secondary cell activation event, or a bandwidth part switching event, or a beam change event, or a connected mode discontinuous reception event, or an idle mode discontinuous reception event, or a combination thereof.

Some examples of the method, apparatuses, and non-transitory computer-readable medium described herein may further include operations, features, means, or instructions for receiving a SSB transmission prior to the triggering event occurring.

Some examples of the method, apparatuses, and non-transitory computer-readable medium described herein may further include operations, features, means, or instructions for receiving an uplink grant DCI that identifies the resources to be used for the aperiodic TRS.

Some examples of the method, apparatuses, and non-transitory computer-readable medium described herein may further include operations, features, means, or instructions for decoding the uplink grant DCI to identify additional resources to be used for transmission of a channel state information reference signal.

Some examples of the method, apparatuses, and non-transitory computer-readable medium described herein may further include operations, features, means, or instructions for receiving a downlink grant DCI that identifies the resources to be used for the aperiodic TRS.

Some examples of the method, apparatuses, and non-transitory computer-readable medium described herein may further include operations, features, means, or instructions for decoding a first portion of bits of a downlink grant field of the downlink grant DCI to identify a zero grant or invalid grant, and decoding a second portion bits of a second field to identify the indication that the aperiodic TRS may have been triggered, the second field being different from the first portion of bits of the downlink grant field.

In some examples of the method, apparatuses, and non-transitory computer-readable medium described herein, the bits of the second field indicates that the triggering event may have occurred, and the indication of the triggering event further indicates that the aperiodic TRS may be triggered.

Some examples of the method, apparatuses, and non-transitory computer-readable medium described herein may further include operations, features, means, or instructions for receiving the DCI in a same slot as the aperiodic TRS may be received in.

Some examples of the method, apparatuses, and non-transitory computer-readable medium described herein may further include operations, features, means, or instructions for receiving the DCI in a different slot from slot that the aperiodic TRS may be received in.

In some examples of the method, apparatuses, and non-transitory computer-readable medium described herein, the DCI includes at least one of a fallback DCI format or a non-fallback DCI format.

In some examples of the method, apparatuses, and non-transitory computer-readable medium described herein, the DCI includes an indication of a transmission timing parameter associated with the aperiodic TRS.

In some examples of the method, apparatuses, and non-transitory computer-readable medium described herein, the trigger signal may be received in a MAC CE.

Some examples of the method, apparatuses, and non-transitory computer-readable medium described herein may further include operations, features, means, or instructions for determining that a secondary cell may have been activated based on the MAC CE.

In some examples of the method, apparatuses, and non-transitory computer-readable medium described herein, the aperiodic TRS may be received a defined waiting period after the MAC CE.

Some examples of the method, apparatuses, and non-transitory computer-readable medium described herein may further include operations, features, means, or instructions for determining that a beam change event may have occurred based on the MAC CE.

In some examples of the method, apparatuses, and non-transitory computer-readable medium described herein, the triggering event includes at least one of a secondary cell activation event, or a bandwidth part switching event, or a beam change event, or a connected mode discontinuous reception event, or an idle mode discontinuous reception event, or a combination thereof.

In some examples of the method, apparatuses, and non-transitory computer-readable medium described herein, the triggering event may include operations, features, means, or instructions for receiving the trigger signal from an active cell of the UE, and receiving the aperiodic TRS from the secondary cell being activated in the secondary cell activation, where the resources identified in the trigger signal include secondary cell resources used for transmission of the aperiodic TRS.

In some examples of the method, apparatuses, and non-transitory computer-readable medium described herein, the triggering event may include operations, features, means, or instructions for receiving the trigger signal over an active bandwidth part of the UE, and receiving the aperiodic TRS over a bandwidth part being activated in the bandwidth part switching event, where the activated bandwidth part may be different from the active bandwidth part and where the resources identified in the trigger signal include activated bandwidth part resources used for transmission of the aperiodic TRS over the activated bandwidth part.

In some examples of the method, apparatuses, and non-transitory computer-readable medium described herein, the triggering event may include operations, features, means, or instructions for receiving the trigger signal over an active beam of the UE, and receiving the aperiodic TRS over a beam being activated in the beam change event, where the activated beam may be different from the active beam and where the resources identified in the trigger signal include activated beam resources used for transmission of the aperiodic TRS over the activated beam.

A method of wireless communication at a UE is described. The method may include receiving a configuration signal that identifies one or more resources for transmission of an aperiodic TRS, determining that a triggering event associated with the UE has occurred, and receiving the aperiodic TRS based on the determining and according to the one or more resources.

An apparatus for wireless communication at a UE is described. The apparatus may include a processor, memory in electronic communication with the processor, and instructions stored in the memory. The instructions may be executable by the processor to cause the apparatus to receive a configuration signal that identifies one or more resources for transmission of an aperiodic TRS, determine that a triggering event associated with the UE has occurred, and receive the aperiodic TRS based on the determining and according to the one or more resources.

Another apparatus for wireless communication at a UE is described. The apparatus may include means for receiving a configuration signal that identifies one or more resources for transmission of an aperiodic TRS, determining that a triggering event associated with the UE has occurred, and receiving the aperiodic TRS based on the determining and according to the one or more resources.

A non-transitory computer-readable medium storing code for wireless communication at a UE is described. The code may include instructions executable by a processor to receive a configuration signal that identifies one or more resources for transmission of an aperiodic TRS, determine that a triggering event associated with the UE has occurred, and receive the aperiodic TRS based on the determining and according to the one or more resources.

Some examples of the method, apparatuses, and non-transitory computer-readable medium described herein may further include operations, features, means, or instructions for receiving the aperiodic TRS during a paging occasion for the UE while the UE may be operating in an idle mode discontinuous reception state, where occurrence of the paging occasion includes the triggering event.

Some examples of the method, apparatuses, and non-transitory computer-readable medium described herein may further include operations, features, means, or instructions for receiving the aperiodic TRS before an on duration of a connected mode discontinuous reception state, determining, based on receiving the aperiodic TRS, that data may be to be communicated to the UE, and transitioning to an active state from the discontinuous reception state for the data communication.

In some examples of the method, apparatuses, and non-transitory computer-readable medium described herein, the one or more resources include a transmission timing parameter, the transmission timing parameter including a relative timing parameter for transmission of the aperiodic TRS after occurrence of the triggering event.

In some examples of the method, apparatuses, and non-transitory computer-readable medium described herein, the triggering event includes at least one of a secondary cell activation event, or a bandwidth part switching event, or a beam change event, or a connected mode discontinuous reception event, or an idle mode discontinuous reception event, or a combination thereof.

DETAILED DESCRIPTION

Figure 1:
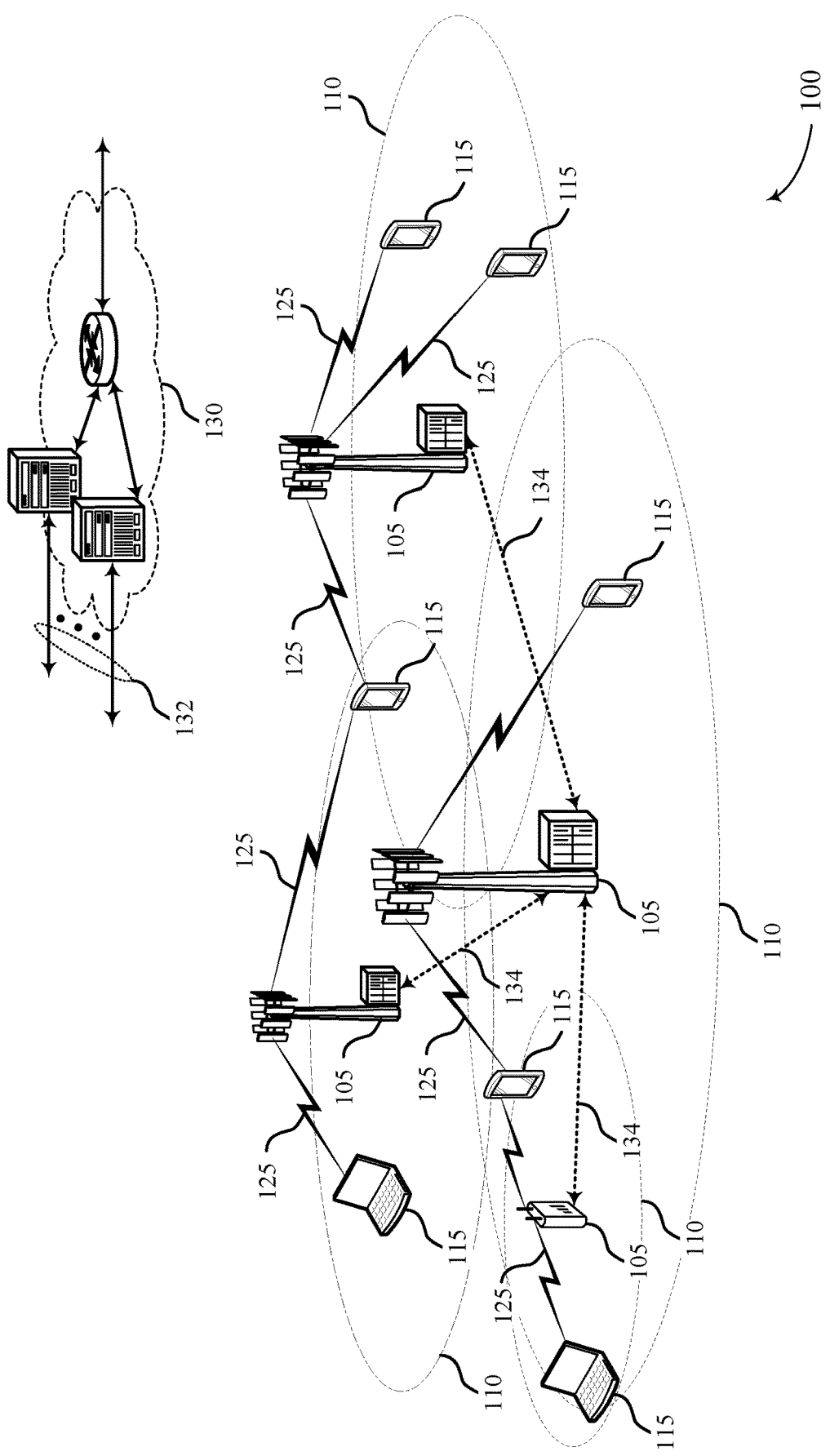
FIG. 1 illustrates an example of a system for wireless communication that supports aperiodic TRS in accordance with aspects of the present disclosure.

Some wireless communication systems may use a reference signal transmission scheme that does not include always on reference signals, e.g., reference signals that are always being transmitted regardless of whether there are any ongoing communications. Instead, the reference signals may be considered periodic reference signals in that, while being transmitted according to a periodic schedule, the periodic reference signals are not always being transmitted (e.g., the periodic reference signals are only transmitted when activated, and are activated for a fixed duration). While this may conserve time/frequency resources for the wireless communication system, it may come at a cost in terms of time/frequency synchronization and tracking between the base station and user equipment (UE), e.g., due to UE mobility, time/frequency shift, etc.

Aspects of the disclosure are initially described in the context of a wireless communications system. Broadly, aspects of the disclosure provide a mechanism for efficient and reliable communication of an aperiodic reference signal, such as an aperiodic tracking reference signal (TRS), between a base station and UE. In some aspects, the transmission of the aperiodic TRS may be trigger-based in that a trigger signal is transmitted in response to a triggering event occurring. The trigger signal may provide or otherwise indicate some or all of the resources to be used for transmission of the aperiodic TRS, such as a transmission timing parameter for transmission of the aperiodic TRS with respect to a timing of the triggering event. The trigger signal may explicitly and/or implicitly provide or otherwise indicate the aperiodic TRS resources in a downlink control indicator (DCI), in a medium access control (MAC) control element (CE), and the like. Accordingly and in response to the triggering event occurring, the base station may transmit (and the UE may receive) the aperiodic TRS using the resource(s) identified or otherwise indicated in the trigger signal. The UE may use the aperiodic TRS for synchronization, tracking, and the like.

In another aspect, the base station and UE may be preconfigured with some or all of the resource(s) to be used for transmission of the aperiodic TRS. For example, the base station may transmit a configuration signal, such as a radio resource control (RRC) signal, to the UE that identifies or otherwise indicates resource(s) that may be used for transmission of the aperiodic TRS. The configuration signal, for example, may identify transmission timing parameter that can be used for transmission of the aperiodic TRS. The transmission timing parameter may be a relative time that the aperiodic TRS is transmitted with respect to the occurrence of a triggering event. Accordingly, the UE and base station may determine that the triggering event has occurred and the base station may transmit the aperiodic TRS in response to the triggering event occurring and according to the resources identified or otherwise indicated in the configuration signal.

Aspects of the disclosure are further illustrated by and described with reference to apparatus diagrams, system diagrams, and flowcharts that relate to aperiodic TRS.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

One or more of the base stations 105 may determine that a triggering event associated with a UE 115 has occurred. The base station(s) 105 may transmit, based at least in part on the determining, a trigger signal that identifies resources to be used for transmission of an aperiodic TRS. The base station(s) 105 may transmit the aperiodic TRS based at least in part on the trigger signal and the identified resources.

One or more of the base stations 105 may transmit a configuration signal to a UE 115, the configuration signal identifying a transmission timing parameter for transmission of an aperiodic TRS. The base station(s) 105 may determine that a triggering event associated with the UE 115 has occurred. The base station(s) 105 may transmit the aperiodic TRS to the UE 115 based at least in part on the determining and according to the transmission timing parameter.

One or more of the UEs 115 may determine that a triggering event associated with the UE 115 has occurred. The UE(s) 115 may receive, based at least in part on the determining, a trigger signal that identifies resources to be used for transmission of an aperiodic TRS. The UE(s) 115 may receive the aperiodic TRS based at least in part on the trigger signal and the identified resources.

One or more of the UEs 115 may receive a configuration signal that identifies a transmission timing parameter for transmission of an aperiodic TRS. The UE(s) 115 may determine that a triggering event associated with the UE 115 has occurred. The UE(s) 115 may receive the aperiodic TRS based at least in part on the determining and according to the transmission timing parameter.

One or more of the UEs 115 may receive, based at least in part on an occurrence of a triggering event associated with the UE 115, a trigger signal that identifies resources to be used for transmission of an aperiodic TRS. The UE(s) 115 may receive the aperiodic TRS based at least in part on the trigger signal and the identified resources. The UE(s) 115 may perform at least one of a tracking function, or a synchronization function, or an alignment function, or a combination thereof, in response to the occurrence of the triggering event and based at least in part on the aperiodic TRS.

One or more of the UEs 115 may receive a configuration signal that identifies one or more resources for transmission of an aperiodic TRS. The UE(s) 115 may determine that a triggering event associated with the UE 115 has occurred. The UE(s) 115 may receive the aperiodic TRS based at least in part on the determining and according to the one or more resources.

Figure 2:
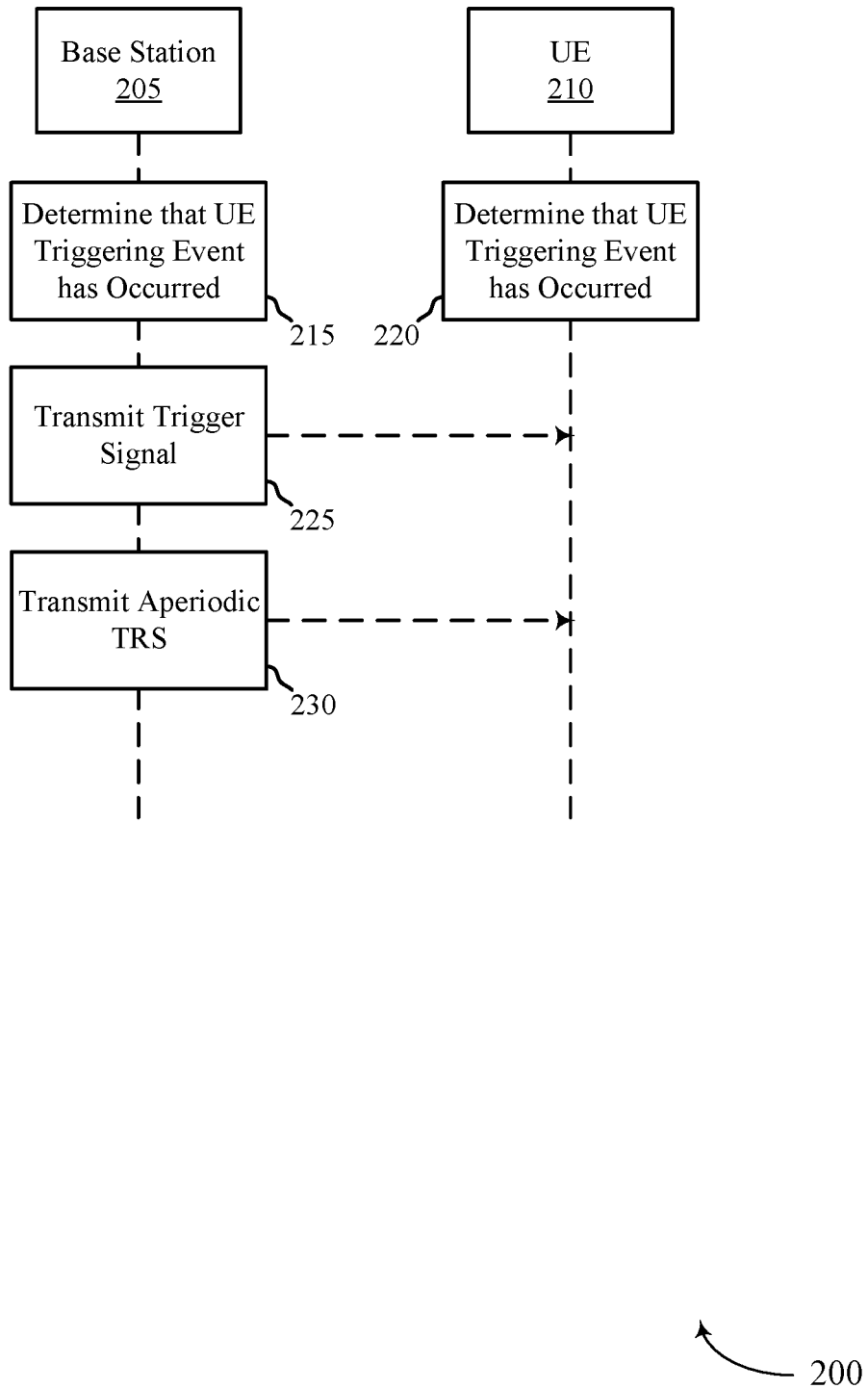
FIG. 2 illustrates an example of a process that supports aperiodic TRS in accordance with aspects of the present disclosure.

FIG. 2 illustrates an example of a process 200 that supports aperiodic TRS in accordance with various aspects of the present disclosure. In some examples, process 200 may implement aspects of wireless communication system 100. Process 200 may include a base station 205 and a UE 210, which may be examples of the corresponding devices described herein. Broadly process 200 illustrates one example of a trigger-based aperiodic TRS transmission scheme.

At 215, base station 205 may determine that a triggering event has occurred for UE 210. In some aspects, the triggering event may be based on activation or deactivation of a secondary cell (SCell), a change in the current bandwidth part (BWP), a change in the current active beam (e.g., a PDSCH beam), a change associated with a DRX mode, and the like. The base station 205 may determine that the triggering event has occurred internally, e.g., based on the base station 205 initiating the triggering event, or externally based on a signal received from UE 210 or some other entity, e.g., based on UE 210 transmitting a signal that initiates the triggering event. In some aspects, such as when UE 210 is operating in a DRX mode, the base station 205 may determine or otherwise detect the triggering event according to a schedule associated with the DRX mode, e.g., during a paging occasion, based on when the UE 210 will be in an on period of the DRX mode, and the like.

At 220, UE 210 may determine that a triggering event has occurred for UE 210. In some aspects, the UE 210 may determine that the triggering event has occurred internally, e.g., based on the UE 210 initiating the triggering event, or externally based on signal received from base station 205 or some other entity. In some aspects, such as when UE 210 is operating in a DRX mode, UE 210 may determine or otherwise detect the triggering event according to a schedule associated with the DRX mode.

In some aspects, one or more SSB transmissions may have occurred prior to the triggering event. For example, the base station 205 may transmit SSBs in a broadcast transmission for UEs operating within its coverage area. The SSB transmissions may identify or otherwise provide an indication of at least a portion of the information associated with the triggering event, e.g., the SSB may indicate a change in an active beam, a change in a BWP, and the like. In some aspects transmission of the SSB signals may provide an indication that the triggering event has occurred or will occur at some point in time. Thus, the base station 205 and/or UE 210 may use, at least to some degree, the SSB transmissions to detect or otherwise determine that the triggering event has occurred.

At 225, base station 205 may transmit (and UE 210 may receive) a trigger signal. In some aspects, the trigger signal may identify some or all of the resources that are to be used for transmission of an aperiodic TRS. The identified or otherwise indicated resources may include time and/or frequency resources. The trigger signal may identify or otherwise indicate the resources either explicitly (e.g., using one or more bits or fields) and/or implicitly (e.g., based on some other event indicated in the trigger signal that serves as a trigger for UE 210).

In some aspects, the trigger signal may be transmitted in or otherwise indicated by a DCI. For example, the DCI may include bits or fields that explicitly indicates the aperiodic TRS has been triggered, e.g., a transmission timing parameter associated with the aperiodic TRS. In another example, the DCI may include bits or fields that identify or otherwise indicate the triggering event. In that example the indication of the triggering event may serve as the indication that the aperiodic TRS has been triggered. As one example a function of the DCI (e.g., a BWP switching DCI) may serve as a trigger for the aperiodic TRS transmission. In some aspects, the DCI may be a fallback DCI (DCI format 0_0 and/or 1_0) or a non-fallback DCI (DCI format 0_1 and/or 1_1). The DCI may be transmitted in the same slot or in a different slot than the aperiodic TRS is transmitted in.

In some aspects, the DCI may be a downlink DCI. For example, the resources to be used for the aperiodic TRS transmission may be indicated in downlink grant field of the downlink DCI. As another example, the downlink DCI may include a dummy grant or invalid grant (e.g., a zero grant) in the downlink grant field and then use another (e.g., different) field to provide an indication that the aperiodic TRS has been triggered and/or of the resources to be used for the aperiodic TRS transmission. Thus, aspects of the present disclosure may use a dummy downlink grant (or invalid downlink grant or zero downlink grant) and re-purpose an existing field typically used for a different function to provide an indication of the aperiodic TRS. In addition, this downlink DCI may also provide an indication of the triggering event, such as a SCell activation/deactivation, BWP switching, beam switching, and the like. An example of a dummy downlink grant may include a resource allocation type 0 with 0 RB (all zeros), a resource allocation type 1 with all is used in a frequency domain resource assignment field, and the like. Thus, the base station 205 may configure one or more bits of a downlink grant field of the downlink DCI to indicate a zero grant or invalid grant, and then configure bits of a second field to indicate that the aperiodic TRS has been triggered. The bits configured in the second field may indicate that the triggering event has occurred, and the indication that the triggering event has occurred may provide the indication that the aperiodic TRS transmission has been triggered. The base station 205 and/or UE 210 may know that an aperiodic TRS transmission is triggered whenever the triggering event has occurred.

In some aspects, the DCI may be an uplink DCI. The uplink DCI may extend CSI-RS triggering e.g., the aperiodic TRS trigger indication may be separate from an indication of an aperiodic CSI-RS trigger. Accordingly, the uplink DCI may be configured to provide an indication that the aperiodic TRS has been triggered (e.g., identify or otherwise indicate resources to be used for the aperiodic TRS transmission) in combination with or separate from a CSI-RS trigger.

In another example, the trigger signal may be transmitted in a MAC CE. For example, the MAC CE may be configured to provide an indication that the triggering event has occurred e.g., an indication that a SCell has been activated or deactivated, or that a beam has been changed (e.g., a PDSCH beam), and the like. In some aspects, transmission of the MAC CE may implicitly signal transmission timing for the aperiodic TRS. For example, the aperiodic TRS may be transmitted a certain time after the MAC CE has been transmitted, e.g., a defined waiting period such as a defined number of symbols, or a fixed time period, and the like, after the MAC CE is transmitted. Thus, joint MAC CE based triggering may be used where the MAC CE command for the triggering event may also trigger the aperiodic TRS transmission. The offset or defined waiting period between the MAC CE command and the aperiodic TRS transmission may be hard coded and/or configured between the base station 205 and UE 210.

At 230, base station 205 may transmit (and UE 210 may receive) an aperiodic TRS. The aperiodic TRS may be transmitted based, at least in some aspects, on the trigger signal and the identified or otherwise indicated resources. For example, the aperiodic TRS may be transmitted according to the transmission timing parameter, according to a defined waiting period, etc., as identified or otherwise indicated in the trigger signal. UE 210 and base station 205 may use the aperiodic TRS for various tracking/synchronization/alignment functions.

Thus, one example of a triggering event may be a SCell being activated/deactivated. In some aspects, the aperiodic TRS transmission may be tied to the MAC CE command to activate the SCell. The timeline with respect to the MAC CE command may be hard coded. In some aspects, the trigger signal may be sent in the DCI (e.g., a DCI triggered aperiodic TRS), where the SCell is detected before RRC configuration of the SCell. The DCI based trigger of the aperiodic TRS may include the aperiodic TRS being decoded based on SSB tracking. For example, a deactivated SCell SSB may be periodically monitored. For an SSB-less carrier, CSI-RS based tracking may also be used. In some aspects, the indication of the trigger signal may be transmitted or otherwise indicated to the UE 210 over one or more of the currently active cell(s) (e.g., a primary cell or one or more secondary cells that are active with UE 210) that are being used for wireless communications between the UE 210 and the base station 205. The trigger signal may carry or otherwise convey an indication of resources that are for the new SCell being activated for the UE 210, e.g., time/frequency resources corresponding to the activated SCell. The aperiodic TRS may then be transmitted over the activated SCell resources (e.g., from the SCell), which UE 210 may then utilize for tracking/synchronization/alignment functions with respect to the newly activated SCell.

Another example of a triggering event may be BWP switching. In a DCI triggered aperiodic TRS example, the DCI triggering the aperiodic TRS may be decoded based on SSB tracking. The SSB may be periodically monitored for tracking regardless of BWP switching. When BWP switching is based on DCI, the BWP switching DCI may also trigger the aperiodic TRS. The timeline with respect to the DCI can be configured via the DCI or RRC signaling. In a downlink BWP switching DCI, some aspects may repurpose existing fields with a dummy downlink grant (such as a zero grant or an invalid grant) of the downlink BWP switching DCI or the downlink BWP DCI may always trigger an aperiodic TRS. In an uplink BWP switching DCI (involving a downlink BWP switching), the uplink BWP DCI may also trigger the aperiodic TRS. In some aspects, the indication of the trigger signal may be transmitted or otherwise indicated to the UE 210 over one or more of the currently active BWP(s) that are being used for wireless communications between the UE 210 and the base station 205. The trigger signal may carry or otherwise convey an indication of resources that are for the new BWP being activated for the UE 210, e.g., time/frequency resources corresponding to the activated BWP. The aperiodic TRS may then be transmitted over the activated BWP resources, which UE 210 may then utilize for tracking/synchronization/alignment functions with respect to the newly activated BWP.

Another example of a triggering event may be a beam switching event. In some aspects, the aperiodic TRS may be triggered in connection with PDSCH beam changes. For PDSCH beam changes, there may be no concerns with respect to decoding the DCI triggering the aperiodic TRS. In some aspects, triggering of the aperiodic TRS transmission may be tied to the DCI indicating the PDSCH beam change. The timeline with respect to the DCI indicating PDSCH beam change and the aperiodic TRS transmission may be configurable, e.g., via the DCI or RRC. In some aspects, the indication of the trigger signal may be transmitted or otherwise indicated to the UE 210 over one or more of the currently active beam(s) that are being used for wireless communications between the UE 210 and the base station 205. The trigger signal may carry or otherwise convey an indication of resources on the new beam being activated for the UE 210, e.g., time/frequency resources corresponding to the beam to be activated. The aperiodic TRS may then be transmitted over these resources, which UE 210 may then utilize for tracking/synchronization/alignment functions with respect to the newly activated beam.

Another example of a triggering event may be based on UE 210 operating in a connected DRX mode. In some aspects, a UE-specific RRC signaling may be used to configure the aperiodic TRS. This may support aperiodic TRS transmission before the connected DRX on duration. The offset between the aperiodic TRS and the connected DRX on duration may be UE-specifically configured. The UE 210 may assume the aperiodic TRS is transmitted before the connected DRX on duration when the UE 210 is expected to be scheduled for communications. In some aspects for a DCI-triggered aperiodic TRS, UE 210 may support aperiodic TRS during the connected DRX on duration via the DCI triggered aperiodic TRS. The UE 210 may maintain tracking, at least to some degree, to be able to decode the DCI triggering the aperiodic TRS. In some aspects, a periodic TRS instance before a connected DRX on duration may be used as a tracking reference. Other periodic TRS occasions occurring during a connected DRX off state may not be transmitted.

Another example of a triggering event may be based on UE 210 operating in an idle mode DRX. Aspects of the present disclosure may support aperiodic TRS transmission before or during an idle mode DRX paging occasion. If the aperiodic TRS is transmitted during the idle mode DRX paging occasion, off-line processing of the aperiodic TRS may be assumed. UE 210 may assume that the aperiodic TRS is transmitted before or during the idle mode DRX paging occasion, e.g., when the UE 210 is expected to be paged. Aspects of the aperiodic TRS trigger may be configured e.g., cell specific, via RRC signaling.

Figure 3:
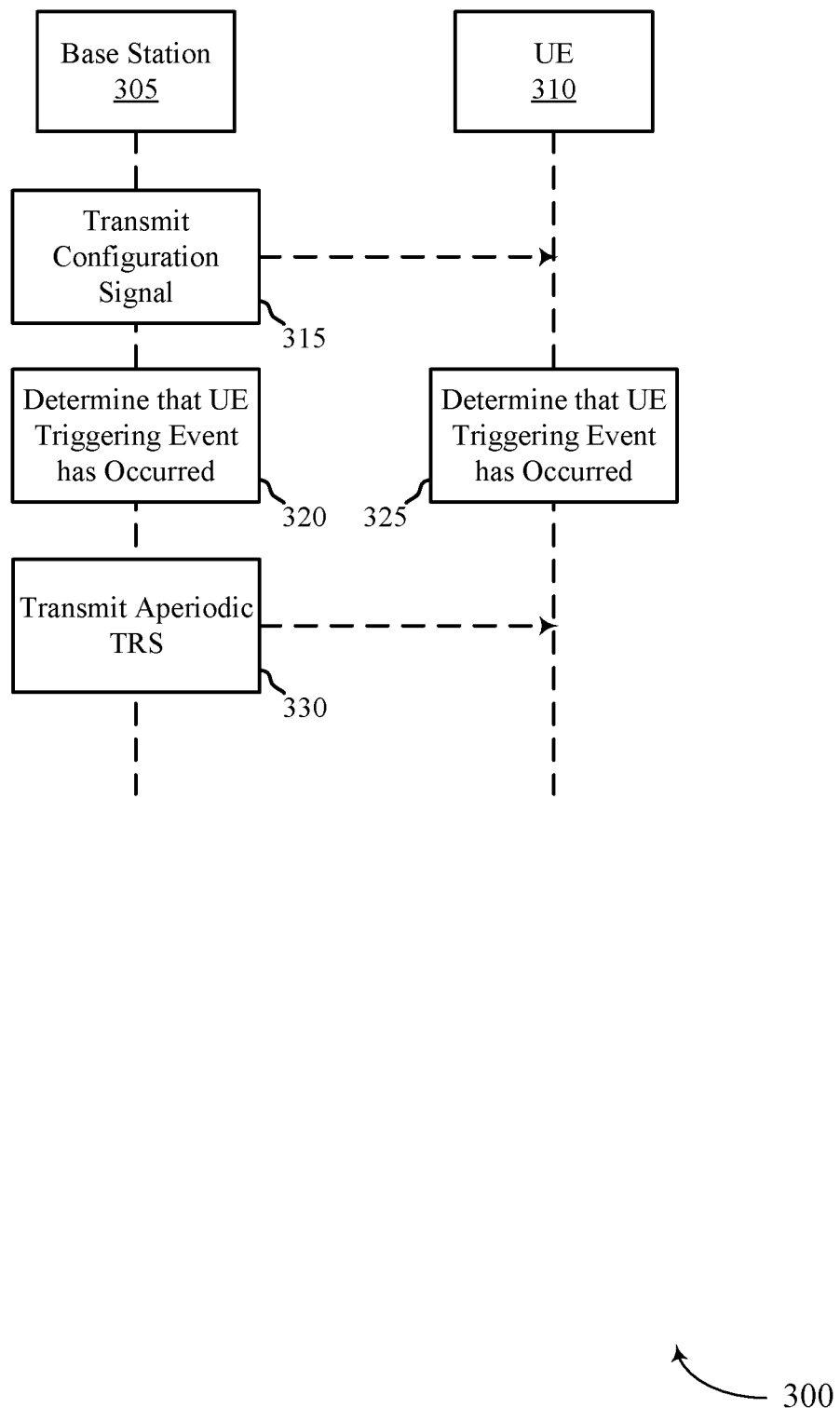
FIG. 3 illustrates an example of a process that supports aperiodic TRS in accordance with aspects of the present disclosure.

FIG. 3 illustrates an example of a process 300 that supports aperiodic TRS in accordance with various aspects of the present disclosure. In some examples, process 300 may implement aspects of wireless communication system 100 and/or process 200. Process 300 may include a base station 305 and a UE 310, which may be examples of the corresponding devices described herein. Broadly, process 300 illustrates one example of pre-configuration based aperiodic TRS transmission.

At 315 base station 305 may transmit (and UE 310 may receive) a configuration signal. The configuration signal may identify or otherwise provide an indication of one or more resources that may be used for transmission of an aperiodic TRS. Broadly, the identified or otherwise indicated resources may be time and/or frequency resources. In one example, the configuration signal may identify or otherwise indicate a transmission timing parameter as some or all of the resources that may be used for the aperiodic TRS transmission. In some aspects, the configuration signal may be an RRC signal, such as a cell-specific and/or a UE-specific RRC signal. The configuration signal may be transmitted one time, e.g., during initial cell acquisition, and/or may be transmitted multiple times, e.g., during a reconfiguration procedure. In some aspects, the identified resources for the aperiodic TRS may be identified on, or otherwise associated with the event target (e.g., resources on a new BWP, resources on a new beam, resources on a SCell being activated, etc.). Without identifying these resources on the event target, the UE would need to wait a longer period of time to detect aperiodic TRS transmission on the target (e.g., on the newly activated SCell, on the new beam or BWP, etc.).

In some aspects, the transmission timing parameter may be an absolute timing parameter and/or a relative timing parameter for transmission of the aperiodic TRS. As one example, the transmission timing parameter may be a relative timing parameter for transmission of the aperiodic TRS after the triggering event has occurred. For example, the transmission timing parameter may be a defined number of symbols, a defined time duration, and the like, that base station 305 transmits the aperiodic TRS transmission after the triggering event has occurred.

In some aspects, the configuration signal may provide for semi-statically configured aperiodic TRS. The aperiodic TRS transmission timing may be configured (e.g., in a UE-specific RRC signal) with respect to the triggering event (such as a periodic triggering event in a DRX cycle). The aperiodic TRS may be triggered before an idle mode DRX paging occasion, before a connected mode DRX on duration, and the like. An offset between the aperiodic TRS in the idle mode DRX paging occasion and/or connected mode DRX on duration may be configurable (e.g., within a certain range). The aperiodic TRS may be transmitted when the UE is paged and/or when the UE is scheduled in that cycle, e.g., may not always be transmitted with periodic events such as every DRX cycle. Thus the aperiodic TRS may serve as a wake-up signal for the UE.

At 320, base station 305 may determine that a triggering event has occurred for UE 310. In some aspects, the triggering event may be based on activation or deactivation of a SCell, a change in the current BWP, a change in the current active beam (e.g., a PDSCH beam), a change associated with a DRX mode, and the like. The base station 305 may determine that the triggering event has occurred internally, e.g., based on the base station 305 initiating the triggering event, or externally based on a signal received from UE 310 or some other entity, e.g., based on UE 310 transmitting a signal that initiates the triggering event. In some aspects, such as when UE 310 is operating in a DRX mode, the base station 305 may determine or otherwise detect the triggering event according to a schedule associated with the DRX mode, e.g., during a paging occasion, based on when the UE 310 will be in an on period of the DRX mode, and the like.

At 325, UE 310 may determine that a triggering event has occurred for UE 310. In some aspects, the UE 310 may determine that the triggering event has occurred internally, e.g., based on the UE 310 initiating the triggering event, or externally based on signal received from base station 305 or some other entity. In some aspects, such as when UE 310 is operating in a DRX mode, UE 310 may determine or otherwise detect the triggering event according to a schedule associated with the DRX mode. In In some aspects, one or more SSB transmissions may have occurred prior to the triggering event. For example, the base station 305 may transmit SSBs in a broadcast transmission for UEs operating within its coverage area. The SSB transmissions may identify or otherwise provide an indication of at least a portion of the information associated with the triggering event, e.g., the SSB may indicate a change in an active beam, a change in a BWP, and the like. In some aspects transmission of the SSB signals may provide an indication that the triggering event has occurred or will occur at some point in time. Thus, the base station 305 and/or UE 310 may use, at least to some degree, the SSB transmissions to detect or otherwise determine that the triggering event has occurred.

At 330, base station 305 may transmit (and UE 310 may receive) an aperiodic TRS. The aperiodic TRS may be transmitted based, at least in some aspects, on the trigger signal and the identified or otherwise indicated resources from the configuration signal. For example, the aperiodic TRS may be transmitted according to the transmission timing parameter, according to a defined waiting period, etc., as identified or otherwise indicated in the configuration signal. UE 310 and base station 305 may use the aperiodic TRS for various tracking/synchronization/alignment functions.

Figure 4:
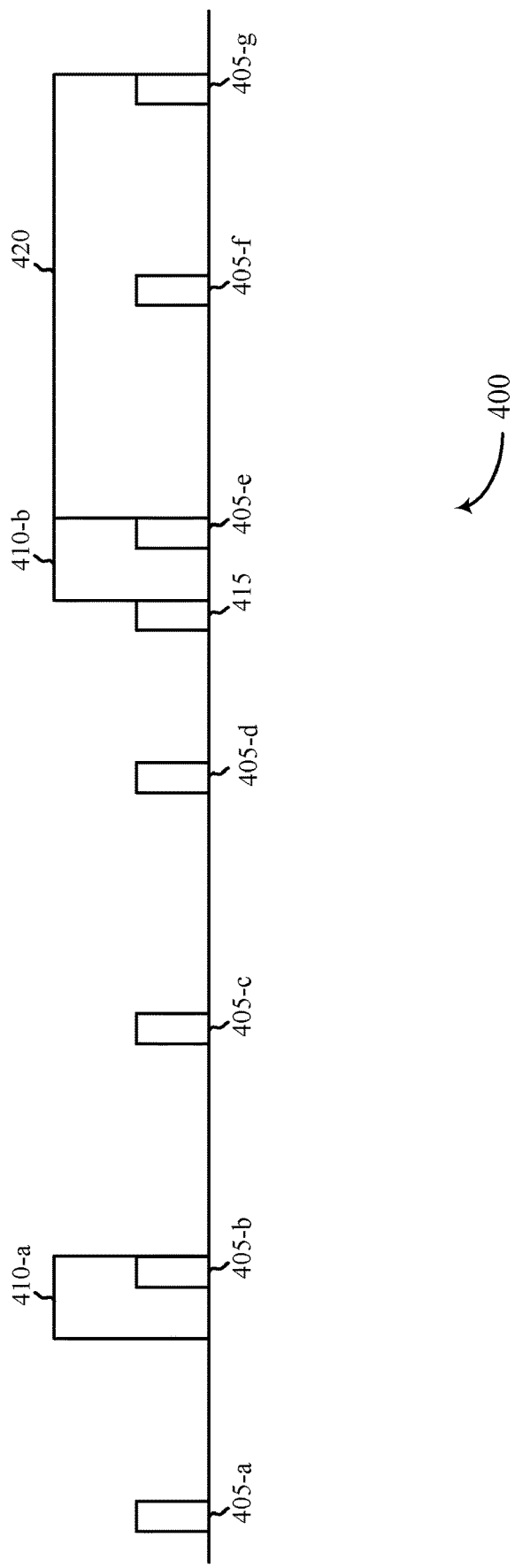
FIG. 4 illustrates an example of a timing diagram that supports aperiodic TRS in accordance with aspects of the present disclosure.

FIG. 4 illustrates an example of a timing diagram 400 that supports aperiodic TRS in accordance with various aspects of the present disclosure. In some examples, timing diagram 400 may implement aspects of wireless communication system 100 and/or processes 200/300. Aspects of timing diagram 400 may be implemented by UE and/or a base station, which may be examples of the corresponding devices described herein. Broadly, timing diagram 400 illustrates one example of aperiodic TRS transmission when a UE is operating in a connected DRX mode.

Generally, the base station and UE may be configured for periodic TRSs 405. The periodic TRSs 405 may not be always on, but may only be transmitted according to a periodic schedule when periodic TRS transmissions are activated. The connected DRX mode may generally include one or more on duration time periods 410 that the UE transitions to an on duration to monitor for paging signals from a base station. For example, the UE may transition to an on duration during on duration time period 410-*a* and monitor for a paging signal from the base station. Once the UE determines that there is no paging signal received, the UE may again transition to an inactive or off (e.g., idle) state. Generally, while the UE is in the inactive or off state, the periodic TRSs 405 may not be transmitted, e.g., periodic TRS is inactive. Thus for example, periodic TRS 405-*a*, 405-*b*, 405-*c*, and 405-*d* may not be transmitted.

The base station may determine that a triggering event has occurred with respect to the UE, e.g., the base station may have data to communicate to the UE. In some aspects, the base station may pre-configure the UE with some are all of the resources to be used for aperiodic TRS transmission, such as by transmitting a configuration signal to the UE as described with respect to FIG. 3. Accordingly, based on the triggering event having occurred and according to the configuration information, the base station may transmit an aperiodic TRS 415 prior to the on duration time period 410-*b*. In some aspects, the UE may know based on the configuration information signaled from the base station that an aperiodic TRS will be transmitted immediately before (as shown) and/or during (not shown) the on duration time period 410-*b*.

Accordingly, the UE may wake up early (e.g., before the on duration time period 410-*b*) and detect the aperiodic TRS 415. Based on detecting the aperiodic TRS 415, the UE may determine or otherwise detect that the triggering event has occurred (e.g., the presence of aperiodic TRS 415 provides an indication that the triggering event has occurred). Accordingly, the UE may transition to the on duration time period 410-*b* and receive the paging signal from the base station. Based on the paging signal, the UE may transition to an active state of the connected DRX mode and receive the data transmission during the time period 420. In some aspects, the periodic TRS 405 transmissions may be activated based on the triggering event occurring for the UE. Thus, periodic TRS 405-*e*, 405-*f*, and 405-*g* may be transmitted. In some aspects, the aperiodic TRS 415 may provide a first level of synchronization/tracking and the periodic TRSs 405-*e*, 405-*f*, and 405-*g* may provide additional synchronization and tracking.

Figure 5:
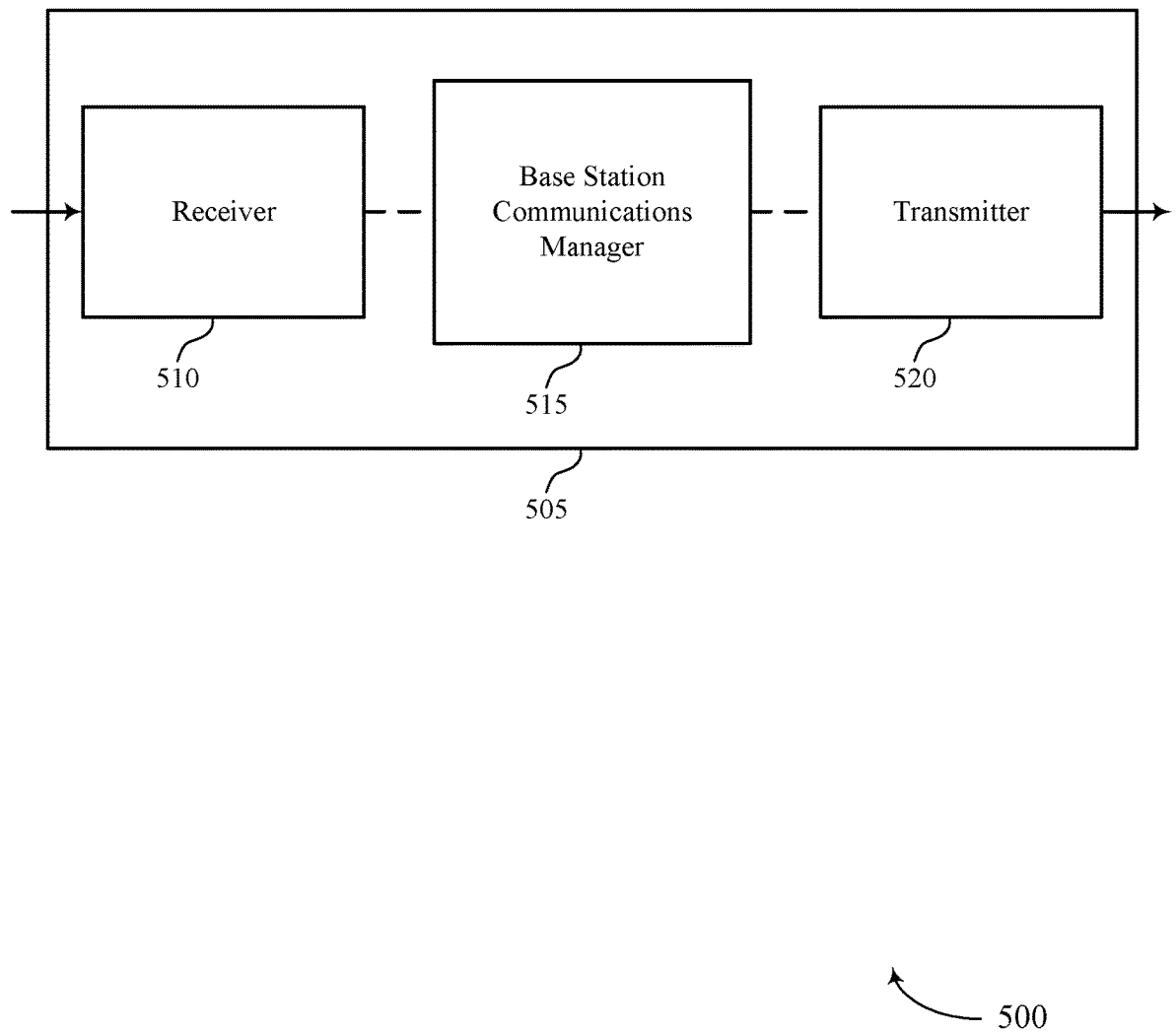
FIGS. 5 through 7 show block diagrams of a device that supports aperiodic TRS in accordance with aspects of the present disclosure.

FIG. 5 shows a block diagram 500 of a wireless device 505 that supports aperiodic TRS in accordance with aspects of the present disclosure. Wireless device 505 may be an example of aspects of a base station 105 as described herein. Wireless device 505 may include receiver 510, base station communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to aperiodic TRS, etc.). Information may be passed on to other components of the device. The receiver 510 may be an example of aspects of the transceiver 835 described with reference to FIG. 8. The receiver 510 may utilize a single antenna or a set of antennas.

Base station communications manager 515 may be an example of aspects of the base station communications manager 815 described with reference to FIG. 8.

Base station communications manager 515 and/or at least some of its various sub-components may be implemented in hardware, software executed by a processor, firmware, or any combination thereof. If implemented in software executed by a processor, the functions of the base station communications manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The base station communications manager 515 and/or at least some of its various sub-components may be physically located at various positions, including being distributed such that portions of functions are implemented at different physical locations by one or more physical devices. In some examples, base station communications manager 515 and/or at least some of its various sub-components may be a separate and distinct component in accordance with various aspects of the present disclosure. In other examples, base station communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 515 may determine that a triggering event associated with a UE has occurred, transmit, based on the determining, a trigger signal that identifies resources to be used for transmission of an aperiodic TRS, and transmit the aperiodic TRS based on the trigger signal and the identified resources. The base station communications manager 515 may also transmit a configuration signal to a UE, the configuration signal identifying a transmission timing parameter for transmission of an aperiodic TRS, determine that a triggering event associated with the UE has occurred, and transmit the aperiodic TRS to the UE based on the determining and according to the transmission timing parameter.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
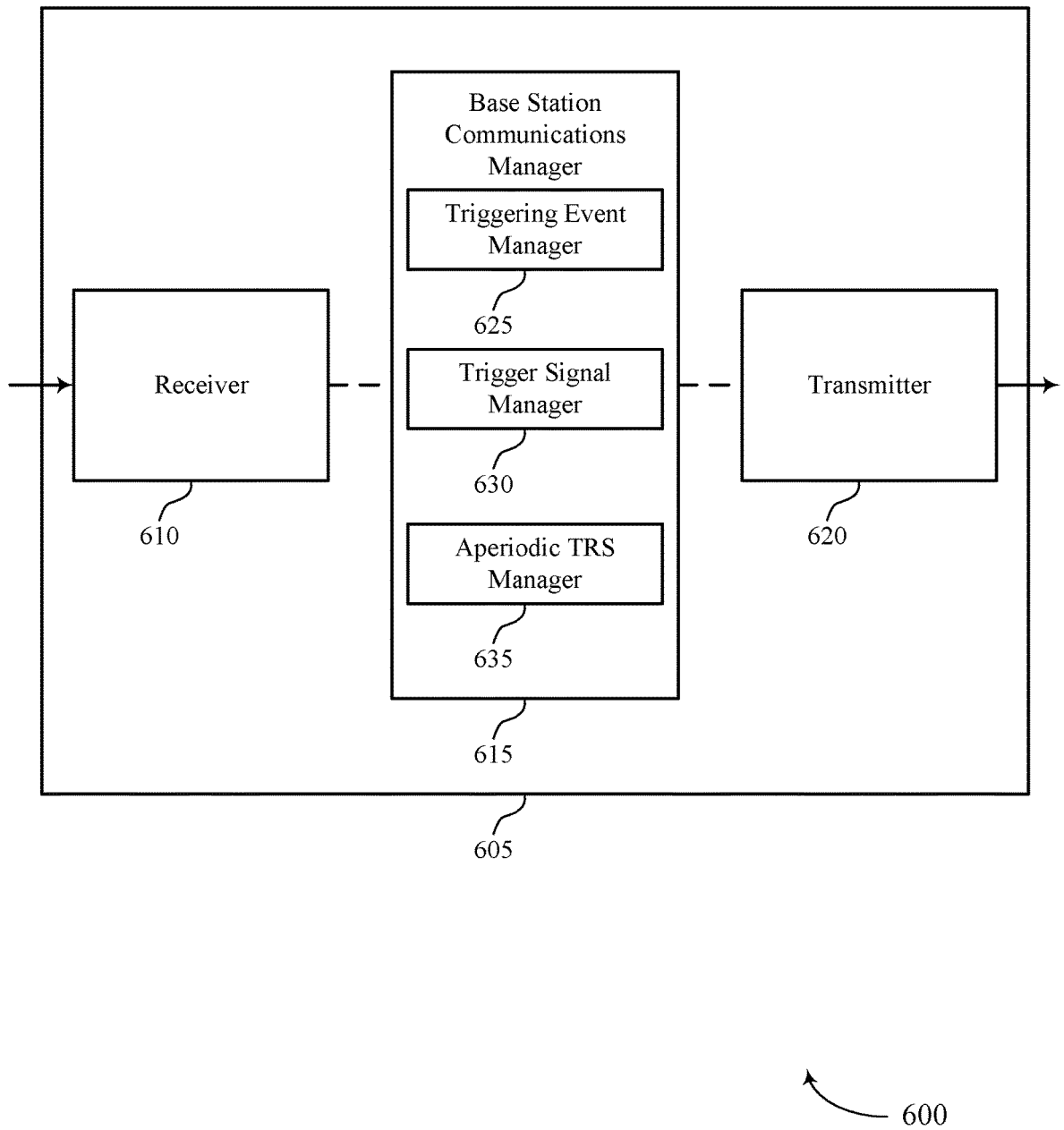

FIG. 6 shows a block diagram 600 of a wireless device 605 that supports aperiodic TRS in accordance with aspects of the present disclosure. Wireless device 605 may be an example of aspects of a wireless device 505 or a base station 105 as described with reference to FIG. 5. Wireless device 605 may include receiver 610, base station communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to aperiodic TRS, etc.). Information may be passed on to other components of the device. The receiver 610 may be an example of aspects of the transceiver 835 described with reference to FIG. 8. The receiver 610 may utilize a single antenna or a set of antennas.

Base station communications manager 615 may be an example of aspects of the base station communications manager 815 described with reference to FIG. 8.

Base station communications manager 615 may also include triggering event manager 625, trigger signal manager 630, and aperiodic TRS manager 635.

Triggering event manager 625 may determine that a triggering event associated with a UE has occurred and determine that a triggering event associated with the UE has occurred. In some cases, the triggering event includes at least one of a SCell activation event, or a BWP switching event, or a beam change event, or a connected mode discontinuous reception event, or an idle mode discontinuous reception event, or a combination thereof.

Trigger signal manager 630 may transmit, based on the determining, a trigger signal that identifies resources to be used for transmission of an aperiodic TRS and transmit a configuration signal to a UE, the configuration signal identifying a transmission timing parameter for transmission of an aperiodic TRS. In some cases, the transmission timing parameter includes a relative timing parameter for transmission of the aperiodic TRS after occurrence of the triggering event.

Aperiodic TRS manager 635 may transmit the aperiodic TRS based on the trigger signal and the identified resources and transmit the aperiodic TRS to the UE based on the determining and according to the transmission timing parameter. In some cases, the aperiodic TRS includes a channel state information reference signal (CSI-RS) for tracking.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
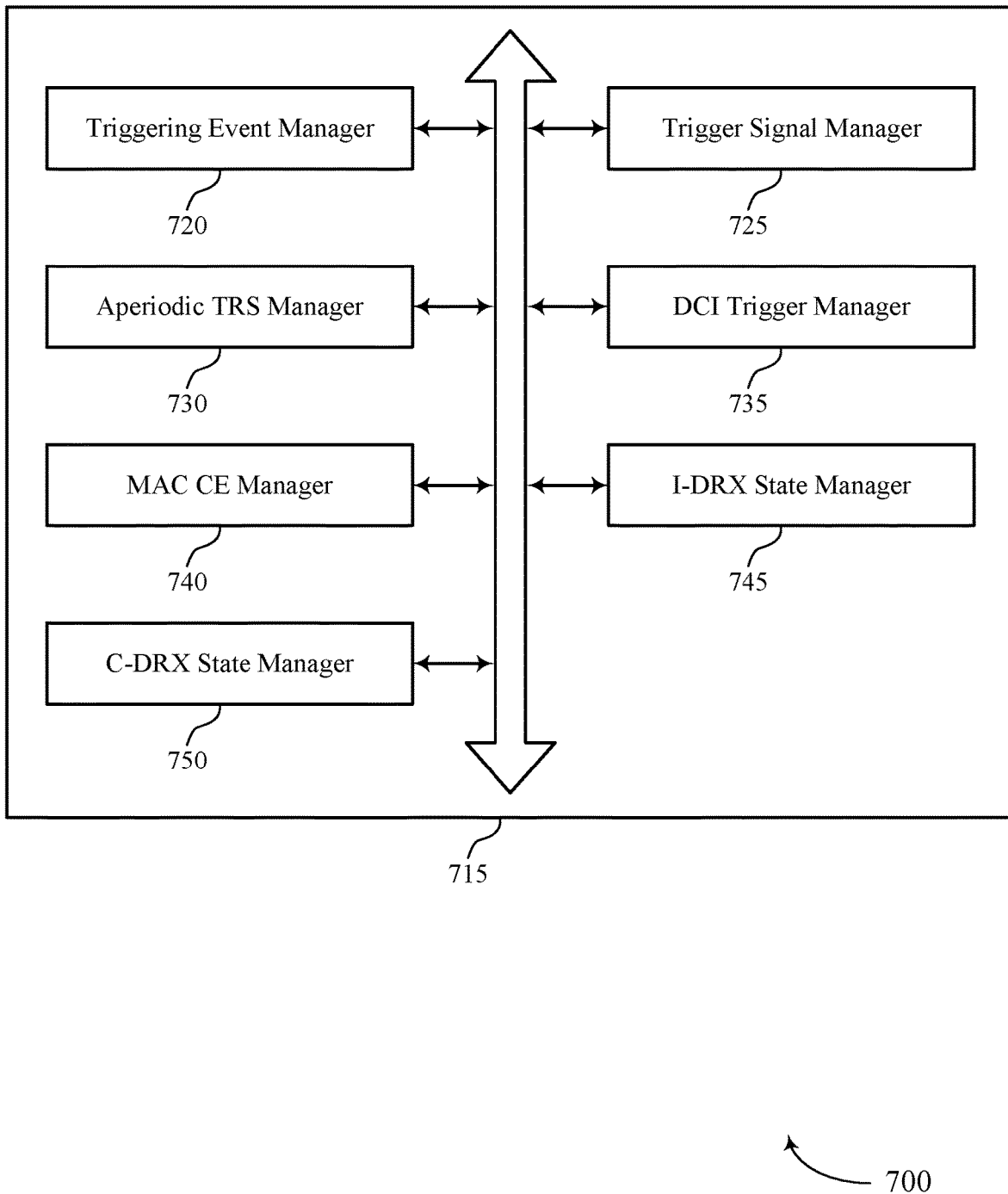

FIG. 7 shows a block diagram 700 of a base station communications manager 715 that supports aperiodic TRS in accordance with aspects of the present disclosure. The base station communications manager 715 may be an example of aspects of a base station communications manager 515, a base station communications manager 615, or a base station communications manager 815 described with reference to FIGS. 5, 6, and 8. The base station communications manager 715 may include triggering event manager 720, trigger signal manager 725, aperiodic TRS manager 730, DCI trigger manager 735, MAC CE manager 740, I-DRX state manager 745, and C-DRX state manager 750.

Each of these modules may communicate, directly or indirectly, with one another (e.g., via one or more buses).

Triggering event manager 720 may determine that a triggering event associated with a UE has occurred and determine that a triggering event associated with the UE has occurred. In some cases, the triggering event includes at least one of a SCell activation event, or a BWP switching event, or a beam change event, or a connected mode discontinuous reception event, or an idle mode discontinuous reception event, or a combination thereof.

Trigger signal manager 725 may transmit, based on the determining, a trigger signal that identifies resources to be used for transmission of an aperiodic TRS and transmit a configuration signal to a UE, the configuration signal identifying a transmission timing parameter for transmission of an aperiodic TRS. In some cases, the transmission timing parameter includes a relative timing parameter for transmission of the aperiodic TRS after occurrence of the triggering event.

Aperiodic TRS manager 730 may transmit the aperiodic TRS based on the trigger signal and the identified resources and transmit the aperiodic TRS to the UE based on the determining and according to the transmission timing parameter. In some cases, the aperiodic TRS includes a CSI-RS for tracking.

DCI trigger manager 735 may perform a SSB transmission prior to the triggering event occurring, the SSB transmission indicating at least a portion of information associated with the triggering event, transmit an uplink DCI that identifies the resources to be used for transmission of the aperiodic TRS, configure the uplink DCI to identify additional resources to be used for transmission of a channel state information reference signal, transmit a downlink DCI that identifies the resources to be used for transmission of the aperiodic TRS, configure bits of a second field to indicate that the aperiodic TRS has been triggered, the second field being different from the downlink grant field, transmit the DCI in a same slot as the aperiodic TRS is transmitted in, transmit the DCI in a different slot from slot that the aperiodic TRS is transmitted in, and configure bits of a downlink grant field of the downlink DCI to indicate a zero grant or invalid grant. In some cases, the trigger signal is transmitted in a DCI. In some cases, the DCI includes an indication of a transmission timing parameter associated with the aperiodic TRS. In some cases, the triggering event includes at least one of a SCell activation event, or a BWP switching event, or a beam change event, or a connected mode discontinuous reception event, or an idle mode discontinuous reception event, or a combination thereof. In some cases, the trigger signal indicates at least one of a field indicating that the aperiodic TRS is triggered or a field indicating the triggering event, where the indication of the triggering event includes the indication that the aperiodic TRS is triggered. In some cases, the configured bits of the second field indicate that the triggering event has occurred, and the indication of the triggering event further indicates that the aperiodic TRS is triggered. In some cases, the DCI includes at least one of a fallback DCI format or a non-fallback DCI format.

MAC CE manager 740 may configure the MAC CE to indicate that a SCell has been activated and configure the MAC CE to indicate that a beam change event has occurred. In some cases, the trigger signal is transmitted in a MAC CE. In some cases, the aperiodic TRS is transmitted a defined waiting period after the MAC CE. In some cases, the triggering event includes at least one of a SCell activation event, or a BWP switching event, or a beam change event, or a connected mode discontinuous reception event, or an idle mode discontinuous reception event, or a combination thereof.

I-DRX state manager 745 may identify a paging occasion for the UE while the UE is operating in an idle mode discontinuous reception state, where the paging occasion includes the triggering event.

C-DRX state manager 750 may determine that data is to be communicated to the UE while the UE is operating in a connected mode discontinuous reception state, identify an on period where the UE wakes from the discontinuous reception state, and transmit the aperiodic TRS prior to or during the on period according to the transmission timing parameter.

Figure 8:
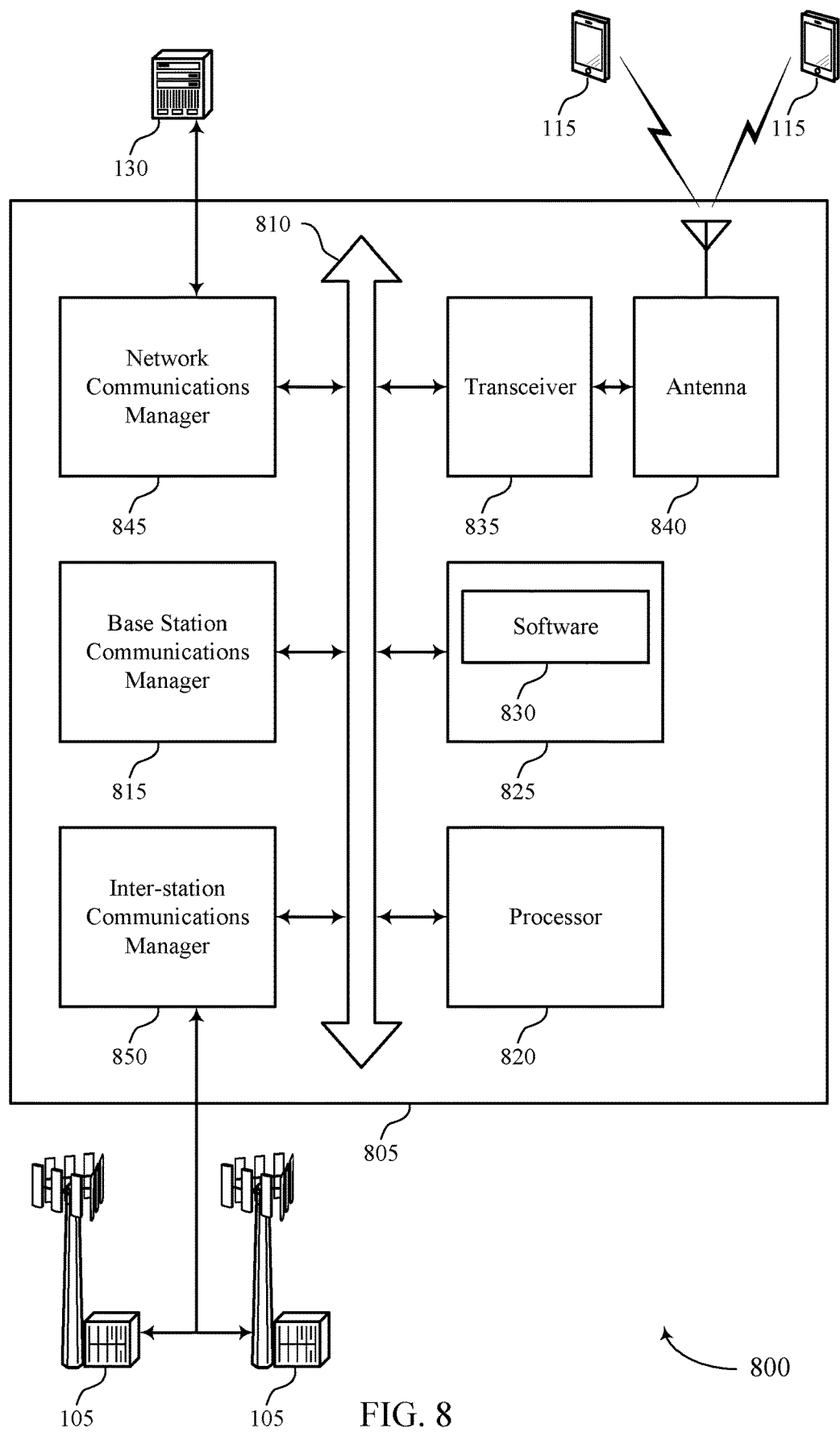
FIG. 8 illustrates a block diagram of a system including a base station that supports aperiodic TRS in accordance with aspects of the present disclosure.

FIG. 8 shows a diagram of a system 800 including a device 805 that supports aperiodic TRS in accordance with aspects of the present disclosure. Device 805 may be an example of or include the components of wireless device 505, wireless device 605, or a base station 105 as described above, e.g., with reference to FIGS. 5 and 6. Device 805 may include components for bi-directional voice and data communications including components for transmitting and receiving communications, including base station communications manager 815, processor 820, memory 825, software 830, transceiver 835, antenna 840, network communications manager 845, and inter-station communications manager 850. These components may be in electronic communication via one or more buses (e.g., bus 810). Device 805 may communicate wirelessly with one or more UEs 115.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting aperiodic TRS).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support aperiodic TRS. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

Network communications manager 845 may manage communications with the core network (e.g., via one or more wired backhaul links). For example, the network communications manager 845 may manage the transfer of data communications for client devices, such as one or more UEs 115.

Inter-station communications manager 850 may manage communications with other base station 105, and may include a controller or scheduler for controlling communications with UEs 115 in cooperation with other base stations 105. For example, the inter-station communications manager 850 may coordinate scheduling for transmissions to UEs 115 for various interference mitigation techniques such as beamforming or joint transmission. In some examples, inter-station communications manager 850 may provide an X2 interface within an LTE/LTE-A wireless communication network technology to provide communication between base stations 105.

Figure 9:
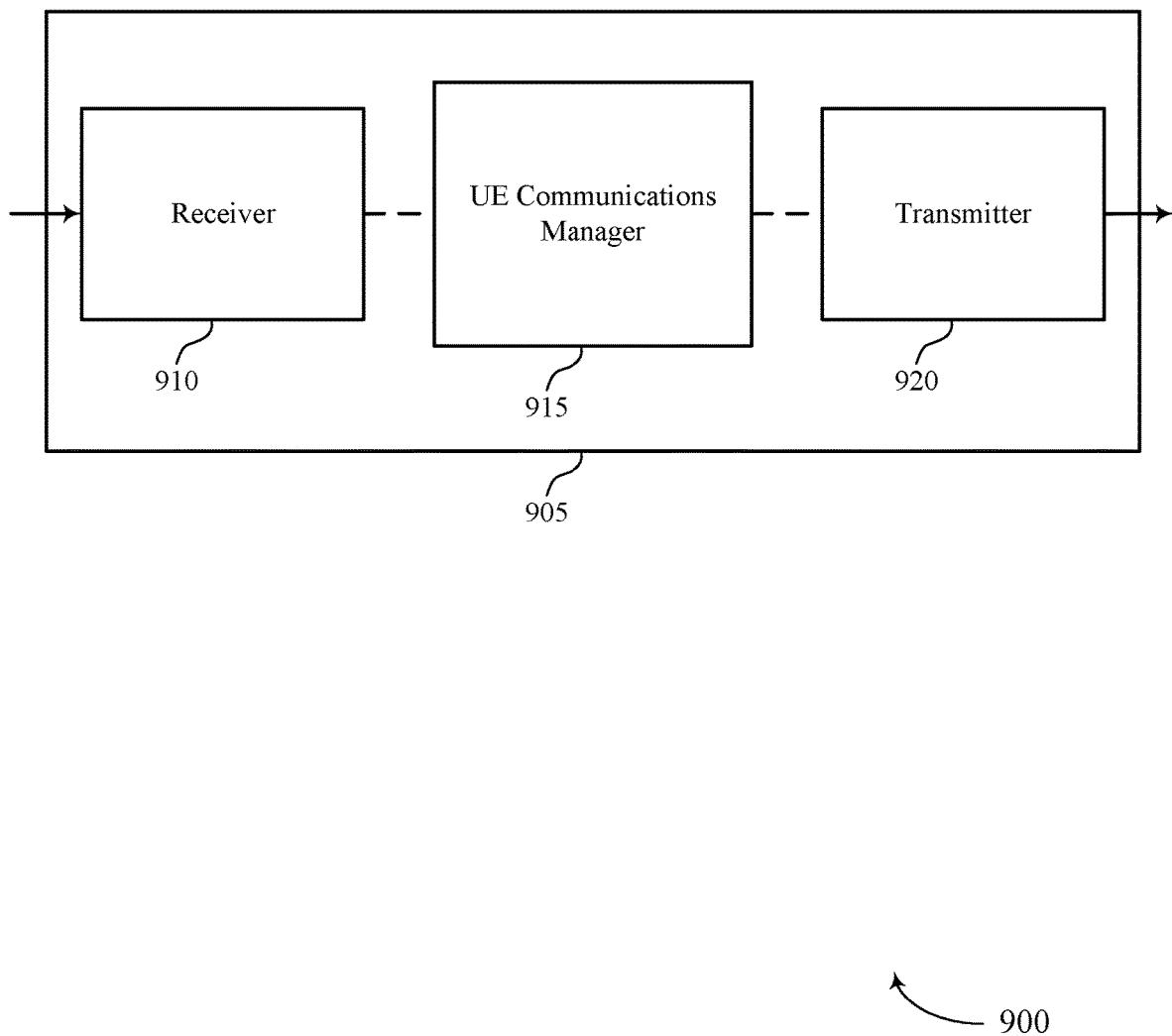
FIGS. 9 through 11 show block diagrams of a device that supports aperiodic TRS in accordance with aspects of the present disclosure.

FIG. 9 shows a block diagram 900 of a wireless device 905 that supports aperiodic TRS in accordance with aspects of the present disclosure. Wireless device 905 may be an example of aspects of a UE 115 as described herein. Wireless device 905 may include receiver 910, UE communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to aperiodic TRS, etc.). Information may be passed on to other components of the device. The receiver 910 may be an example of aspects of the transceiver 1235 described with reference to FIG. 12. The receiver 910 may utilize a single antenna or a set of antennas.

UE communications manager 915 may be an example of aspects of the UE communications manager 1215 described with reference to FIG. 12.

UE communications manager 915 and/or at least some of its various sub-components may be implemented in hardware, software executed by a processor, firmware, or any combination thereof. If implemented in software executed by a processor, the functions of the UE communications manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The UE communications manager 915 and/or at least some of its various sub-components may be physically located at various positions, including being distributed such that portions of functions are implemented at different physical locations by one or more physical devices. In some examples, UE communications manager 915 and/or at least some of its various sub-components may be a separate and distinct component in accordance with various aspects of the present disclosure. In other examples, UE communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 915 may determine that a triggering event associated with the UE has occurred, receive, based on the determining, a trigger signal that identifies resources to be used for transmission of an aperiodic TRS, and receive the aperiodic TRS based on the trigger signal and the identified resources. The UE communications manager 915 may also receive a configuration signal that identifies a transmission timing parameter for transmission of an aperiodic TRS, determine that a triggering event associated with the UE has occurred, and receive the aperiodic TRS based on the determining and according to the transmission timing parameter.

UE communications manager 915 may receive, based at least in part on an occurrence of a triggering event associated with the UE, a trigger signal that identifies resources to be used for transmission of an aperiodic TRS. The UE communications manager 915 may also receive the aperiodic TRS based at least in part on the trigger signal and the identified resources. The UE communications manager 915 may also perform at least one of a tracking function, or a synchronization function, or an alignment function, or a combination thereof, in response to the occurrence of the triggering event and based at least in part on the aperiodic TRS. In some aspects, the identified resources for the aperiodic TRS may be identified on, or otherwise associated with the event target (e.g., resources on a new BWP, resources on a new beam, resources on a SCell being activated, etc.). Without identifying these resources on the event target, the UE would need to wait a longer period of time to detect aperiodic TRS transmission on the target (e.g., on the newly activated SCell, on the new beam or BWP, etc.).

UE communications manager 915 may receive a configuration signal that identifies one or more resources for transmission of an aperiodic TRS. The UE communications manager 915 may also determine that a triggering event associated with the UE has occurred. The UE communications manager 915 may also receive the aperiodic TRS based at least in part on the determining and according to the one or more resources.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
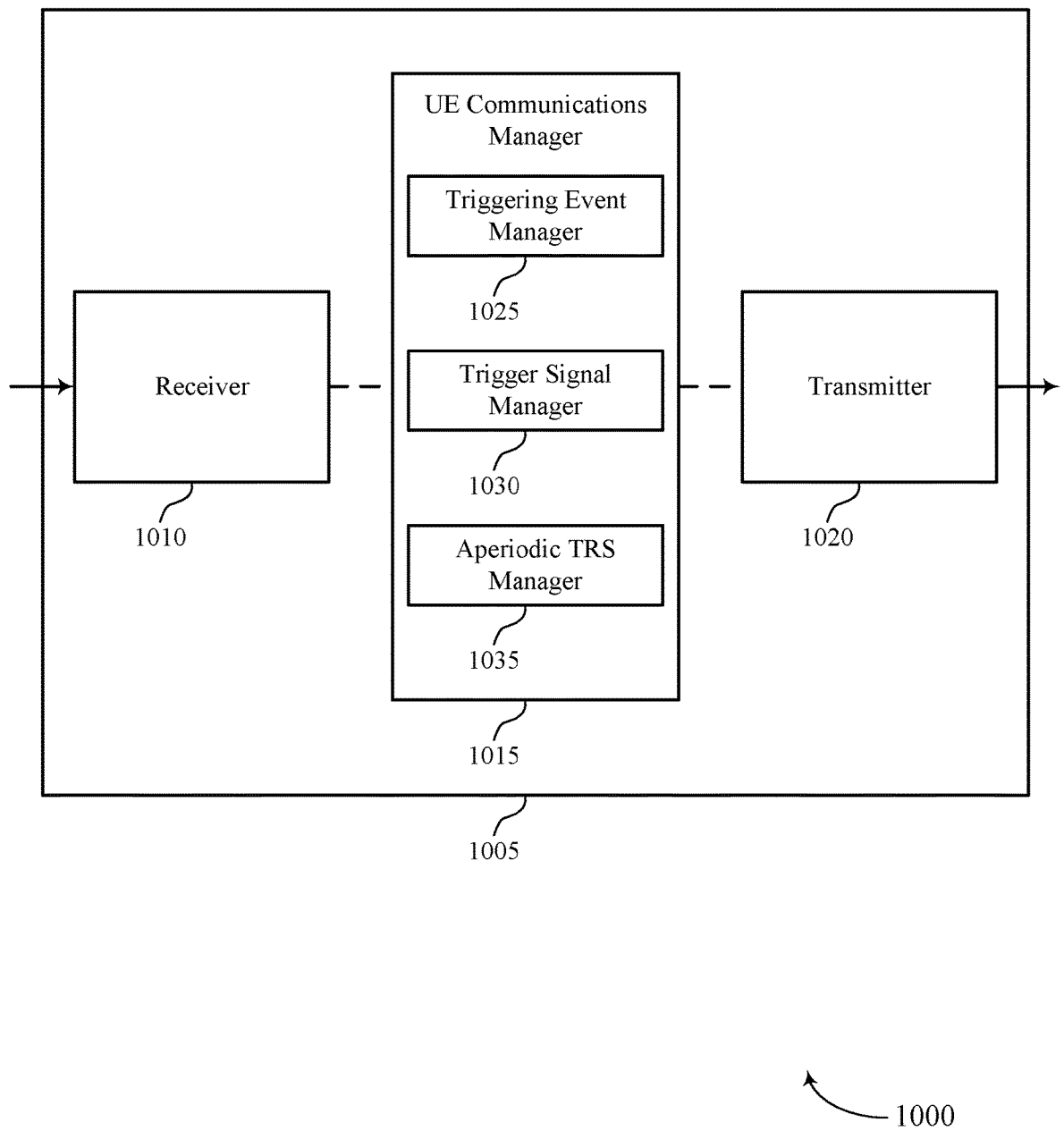

FIG. 10 shows a block diagram 1000 of a wireless device 1005 that supports aperiodic TRS in accordance with aspects of the present disclosure. Wireless device 1005 may be an example of aspects of a wireless device 905 or a UE 115 as described with reference to FIG. 9. Wireless device 1005 may include receiver 1010, UE communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to aperiodic TRS, etc.). Information may be passed on to other components of the device. The receiver 1010 may be an example of aspects of the transceiver 1235 described with reference to FIG. 12. The receiver 1010 may utilize a single antenna or a set of antennas.

UE communications manager 1015 may be an example of aspects of the UE communications manager 1215 described with reference to FIG. 12.

UE communications manager 1015 may also include triggering event manager 1025, trigger signal manager 1030, and aperiodic TRS manager 1035.

Triggering event manager 1025 may determine that a triggering event associated with the UE has occurred. Triggering event manager 1025 may receive, based at least in part on an occurrence of a triggering event associated with the UE, a trigger signal that identifies resources to be used for transmission of an aperiodic TRS.

In some cases, the triggering event includes at least one of a SCell activation event, or a BWP switching event, or a beam change event, or a connected mode discontinuous reception event, or an idle mode discontinuous reception event, or a combination thereof.

Trigger signal manager 1030 may receive, based on the determining, a trigger signal that identifies resources to be used for transmission of an aperiodic TRS and receive a configuration signal that identifies a transmission timing parameter for transmission of an aperiodic TRS. Trigger signal manager 1030 may receive the aperiodic TRS based at least in part on the trigger signal and the identified resources. In some cases, the transmission timing parameter includes a relative timing parameter for transmission of the aperiodic TRS after occurrence of the triggering event.

Aperiodic TRS manager 1035 may receive the aperiodic TRS based on the trigger signal and the identified resources and receive the aperiodic TRS based on the determining and according to the transmission timing parameter. Aperiodic TRS manager 1035 may perform at least one of a tracking function, or a synchronization function, or an alignment function, or a combination thereof, in response to the occurrence of the triggering event and based at least in part on the aperiodic TRS. In some cases, the aperiodic TRS includes a CSI-RS for tracking that is different or otherwise separate from an aperiodic CSI-RS used for channel estimation.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
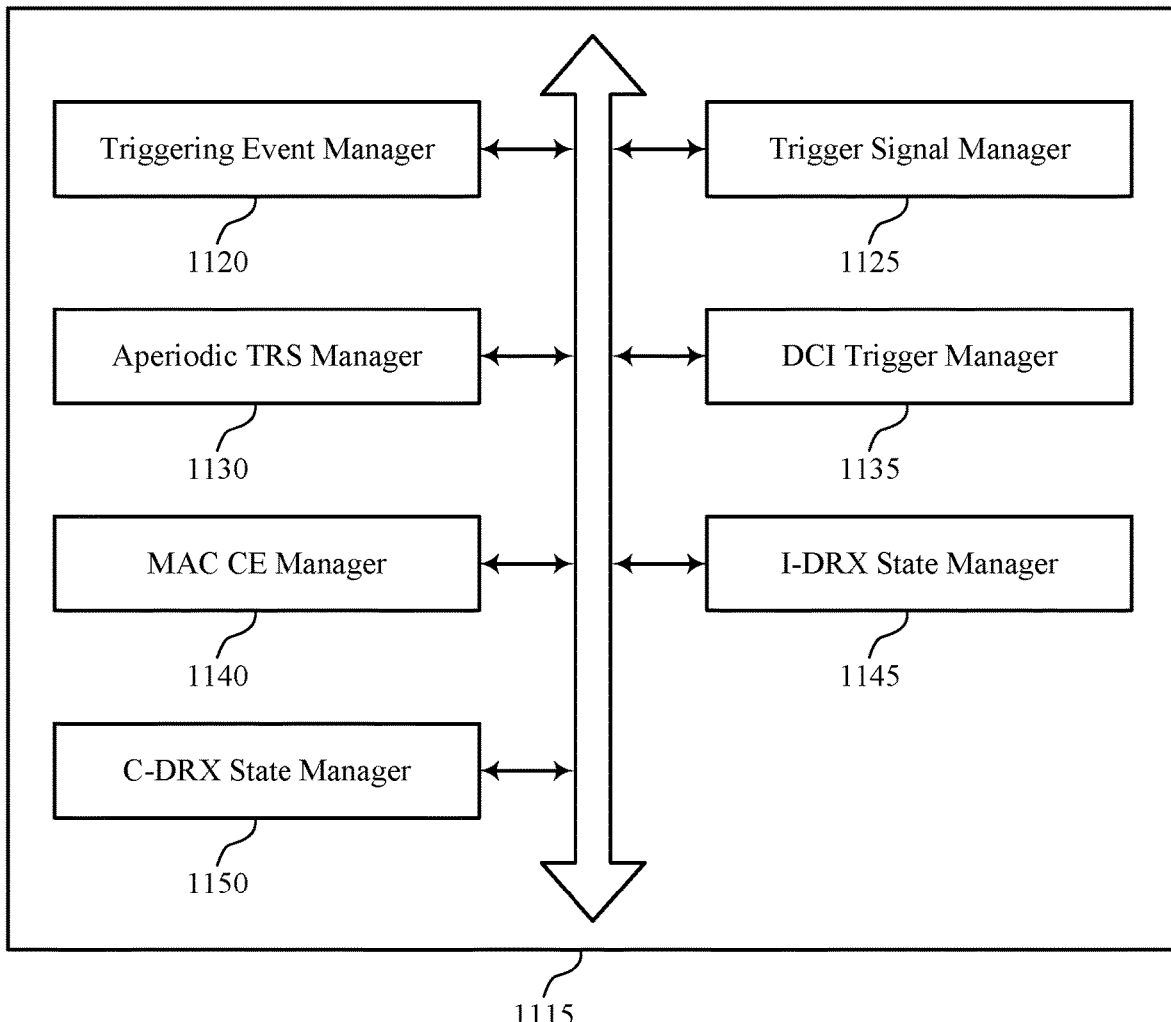

FIG. 11 shows a block diagram 1100 of a UE communications manager 1115 that supports aperiodic TRS in accordance with aspects of the present disclosure. The UE communications manager 1115 may be an example of aspects of a UE communications manager 1215 described with reference to FIGS. 9, 10, and 12. The UE communications manager 1115 may include triggering event manager 1120, trigger signal manager 1125, aperiodic TRS manager 1130, DCI trigger manager 1135, MAC CE manager 1140, I-DRX state manager 1145, and C-DRX state manager 1150. Each of these modules may communicate, directly or indirectly, with one another (e.g., via one or more buses).

Triggering event manager 1120 may determine that a triggering event associated with the UE has occurred. Triggering event manager 1120 may receive, based at least in part on an occurrence of a triggering event associated with the UE, a trigger signal that identifies resources to be used for transmission of an aperiodic TRS. In some cases, the triggering event includes at least one of a SCell activation event, or a BWP switching event, or a beam change event, or a connected mode discontinuous reception event, or an idle mode discontinuous reception event, or a combination thereof.

Trigger signal manager 1125 may receive, based on the determining, a trigger signal that identifies resources to be used for transmission of an aperiodic TRS and receive a configuration signal that identifies a transmission timing parameter for transmission of an aperiodic TRS. Trigger signal manager 1125 may receive the aperiodic TRS based at least in part on the trigger signal and the identified resources. In some cases, the transmission timing parameter includes a relative timing parameter for transmission of the aperiodic TRS after occurrence of the triggering event.

Aperiodic TRS manager 1130 may receive the aperiodic TRS based on the trigger signal and the identified resources and receive the aperiodic TRS based on the determining and according to the transmission timing parameter. Aperiodic TRS manager 1130 may perform at least one of a tracking function, or a synchronization function, or an alignment function, or a combination thereof, in response to the occurrence of the triggering event and based at least in part on the aperiodic TRS. In some cases, the aperiodic TRS includes a CSI-RS for tracking that is distinct or otherwise separate from a conventional aperiodic TRS.

DCI trigger manager 1135 may receive a SSB transmission prior to the triggering event occurring, the SSB transmission indicating at least a portion of information associated with the triggering event, receive an uplink DCI that identifies the resources to be used for transmission of the aperiodic TRS, decode the uplink DCI to identify additional resources to be used for transmission of a channel state information reference signal, receive a downlink DCI that identifies the resources to be used for transmission of the aperiodic TRS, decode bits of a second field to identify the indication that the aperiodic TRS has been triggered, the second field being different from the downlink grant field, receive the DCI in a same slot as the aperiodic TRS is received in, receive the DCI in a different slot from slot that the aperiodic TRS is received in, and decode bits of a downlink grant field of the downlink DCI to identify a zero grant or invalid grant. In some cases, the trigger signal is received in a DCI. In some cases, the DCI includes an indication of a transmission timing parameter associated with the aperiodic TRS. In some cases, the triggering event includes at least one of a SCell activation event, or a BWP switching event, or a beam change event, or a connected mode discontinuous reception event, or an idle mode discontinuous reception event, or a combination thereof. In some cases, the trigger signal indicates at least one of a field indicating that the aperiodic TRS is triggered or a field indicating the triggering event, where the indication of the triggering event includes the indication that the aperiodic TRS is triggered. In some cases, the configured bits of the second field indicates that the triggering event has occurred, and the indication of the triggering event further indicates that the aperiodic TRS is triggered. In some cases, the DCI includes at least one of a fallback DCI format or a non-fallback DCI format.

MAC CE manager 1140 may determine that a SCell has been activated based on the MAC CE and determine that a beam change event has occurred based on the MAC CE. In some cases, the trigger signal is received in a MAC CE. In some cases, the aperiodic TRS is received a defined waiting period after the MAC CE. In some cases, the triggering event includes at least one of a SCell activation event, or a BWP switching event, or a beam change event, or a connected mode discontinuous reception event, or an idle mode discontinuous reception event, or a combination thereof.

I-DRX state manager 1145 may receive the aperiodic TRS during a paging occasion for the UE while the UE is operating in an idle mode discontinuous reception state, where occurrence of the paging occasion includes the triggering event.

C-DRX state manager 1150 may receive the aperiodic TRS before an on duration of a connected mode discontinuous reception state, determine, based on receiving the aperiodic TRS, that data is to be communicated to the UE, and transition to an active state from the discontinuous reception state for the data communication.

In the instance where the triggering event comprises a SCell activation, one or more of the above-described modules or functions may receive the trigger signal from an active cell of the UE and receive the aperiodic TRS from the secondary cell being activated in the secondary cell activation, wherein the resources identified in the trigger signal comprise secondary cell resources used for transmission of the aperiodic TRS.

In the instance where the triggering event comprises a BWP switching event, one or more of the above-described modules or functions may receive the trigger signal over an active bandwidth part of the UE and receive the aperiodic TRS over a bandwidth part being activated in the bandwidth part switching event, wherein the activated bandwidth part is different from the active bandwidth part and wherein the resources identified in the trigger signal comprise activated bandwidth part resources used for transmission of the aperiodic TRS over the activated bandwidth part.

In the instance where the triggering event comprises a beam change event, one or more of the above-described modules or functions may receive the trigger signal over an active beam of the UE and receive the aperiodic TRS over a beam being activated in the beam change event, wherein the activated beam is different from the active beam and wherein the resources identified in the trigger signal comprise activated beam resources used for transmission of the aperiodic TRS over the activated beam.

Figure 12:
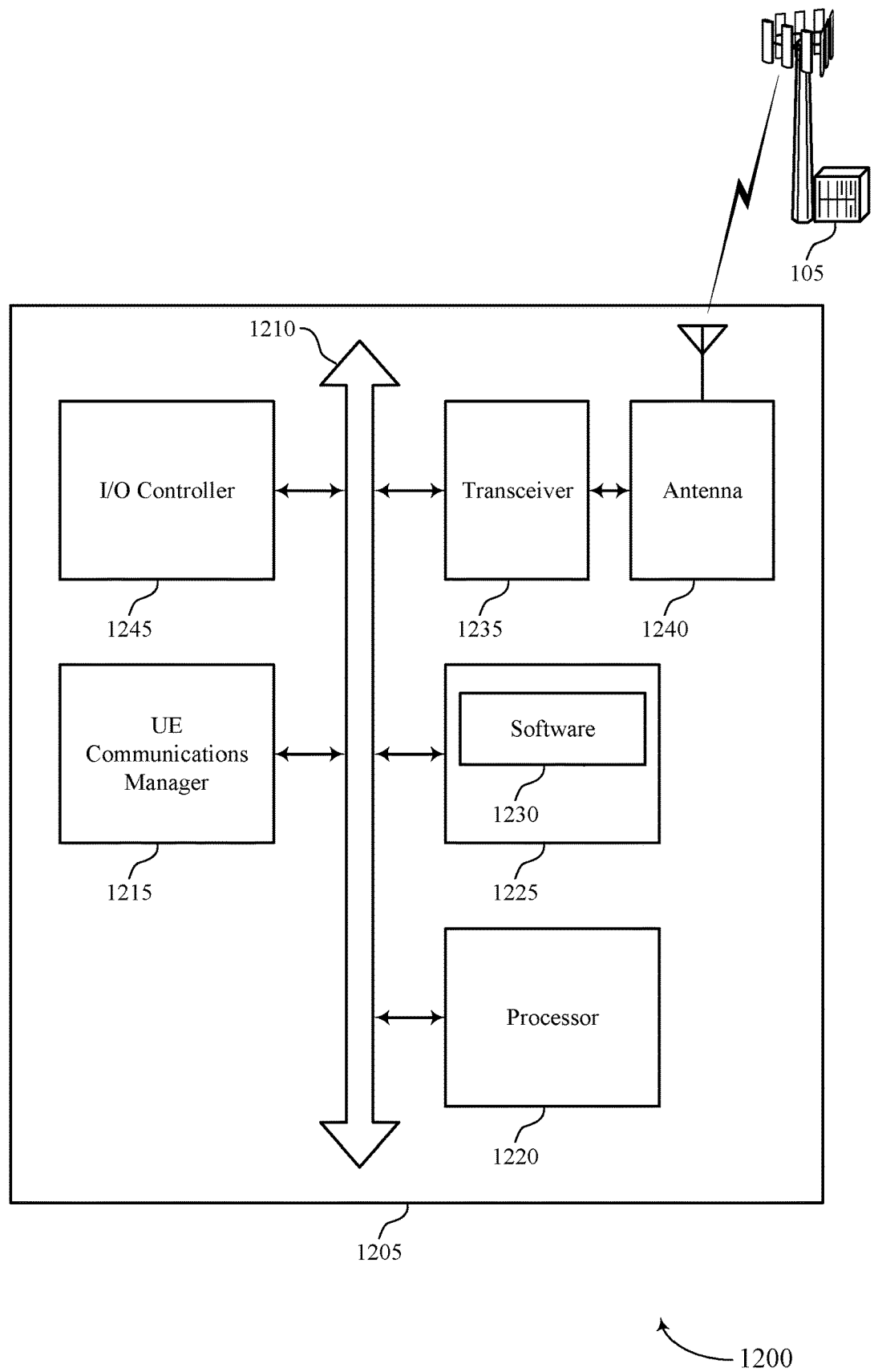
FIG. 12 illustrates a block diagram of a system including a UE that supports aperiodic TRS in accordance with aspects of the present disclosure.

FIG. 12 shows a diagram of a system 1200 including a device 1205 that supports aperiodic TRS in accordance with aspects of the present disclosure. Device 1205 may be an example of or include the components of UE 115 as described above, e.g., with reference to FIG. 1. Device 1205 may include components for bi-directional voice and data communications including components for transmitting and receiving communications, including UE communications manager 1215, processor 1220, memory 1225, software 1230, transceiver 1235, antenna 1240, and I/O controller 1245. These components may be in electronic communication via one or more buses (e.g., bus 1210). Device 1205 may communicate wirelessly with one or more base stations 105.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting aperiodic TRS).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support aperiodic TRS. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system. In other cases, I/O controller 1245 may represent or interact with a modem, a keyboard, a mouse, a touchscreen, or a similar device. In some cases, I/O controller 1245 may be implemented as part of a processor. In some cases, a user may interact with device 1205 via I/O controller 1245 or via hardware components controlled by I/O controller 1245.

Figure 13:
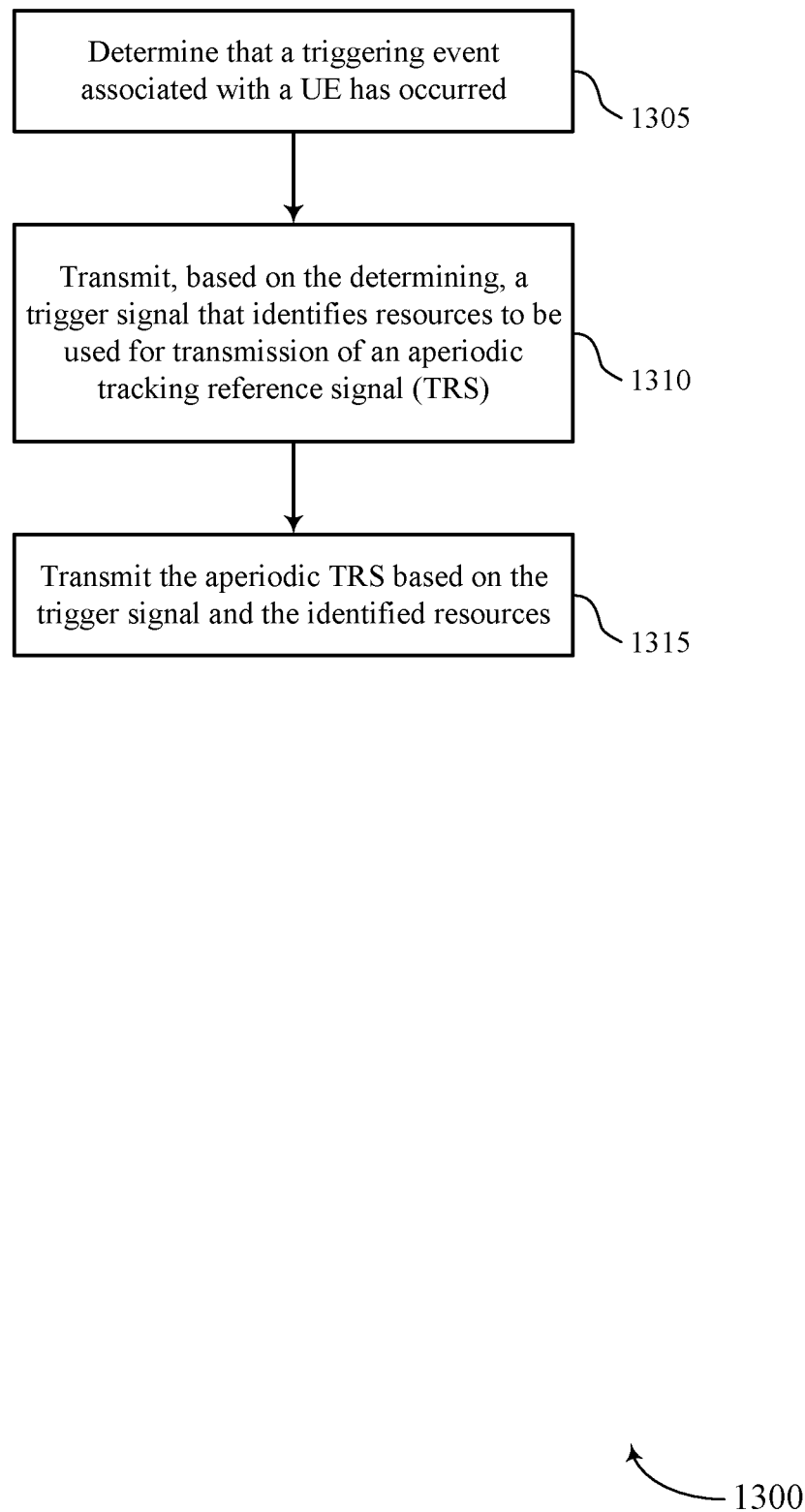
FIGS. 13 through 16 illustrate methods for aperiodic TRS in accordance with aspects of the present disclosure.

FIG. 13 shows a flowchart illustrating a method 1300 for aperiodic TRS in accordance with aspects of the present disclosure. The operations of method 1300 may be implemented by a base station 105 or its components as described herein. For example, the operations of method 1300 may be performed by a base station communications manager as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At 1305 the base station 105 may determine that a triggering event associated with a UE has occurred. The operations of 1305 may be performed according to the methods described herein. In certain examples, aspects of the operations of 1305 may be performed by a triggering event manager as described with reference to FIGS. 5 through 8.

At 1310 the base station 105 may transmit, based at least in part on the determining, a trigger signal that identifies resources to be used for transmission of an aperiodic TRS. The operations of 1310 may be performed according to the methods described herein. In certain examples, aspects of the operations of 1310 may be performed by a trigger signal manager as described with reference to FIGS. 5 through 8.

At 1315 the base station 105 may transmit the aperiodic TRS based at least in part on the trigger signal and the identified resources. The operations of 1315 may be performed according to the methods described herein. In certain examples, aspects of the operations of 1315 may be performed by a aperiodic TRS manager as described with reference to FIGS. 5 through 8.

Figure 14:
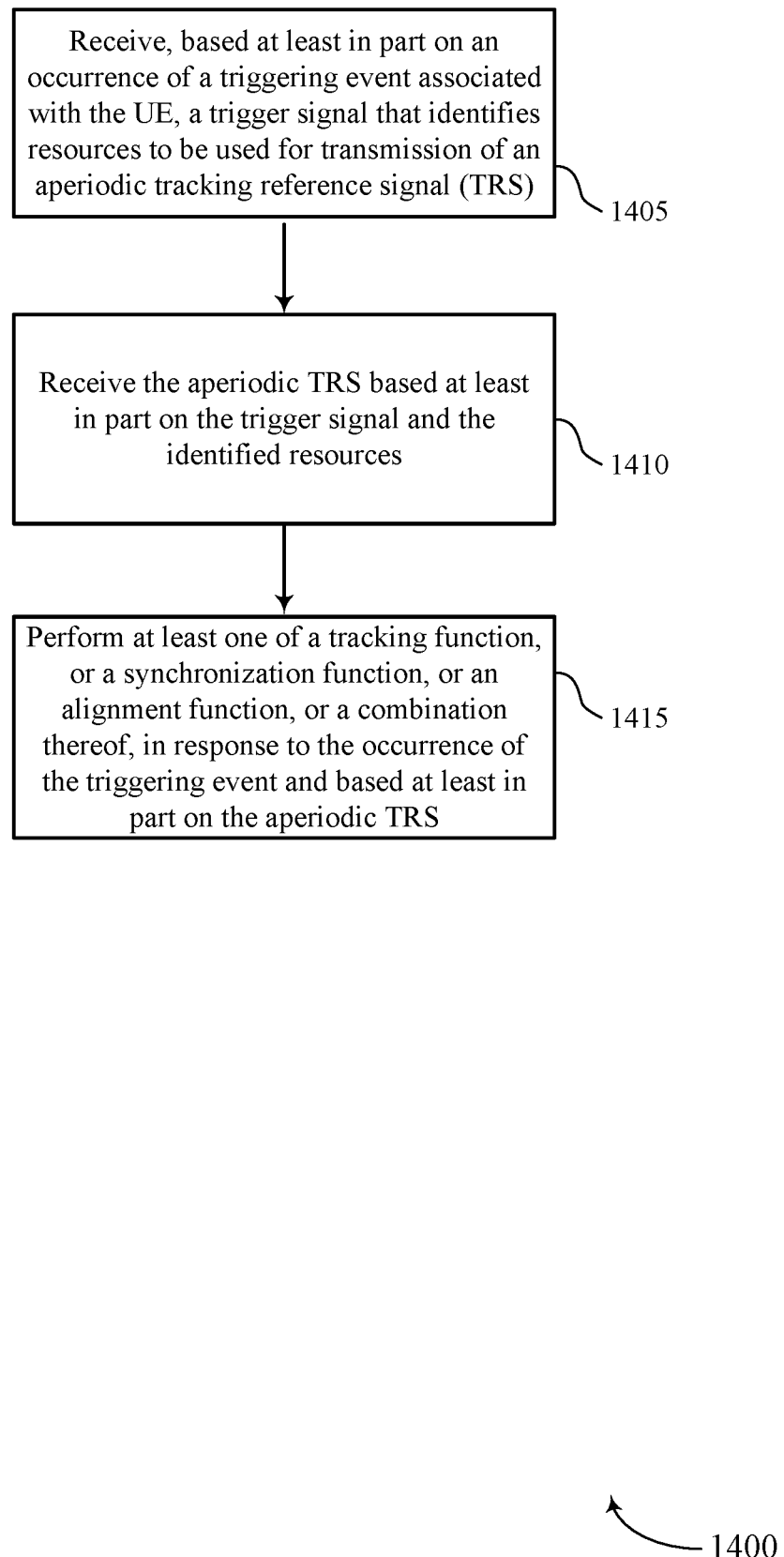

FIG. 14 shows a flowchart illustrating a method 1400 for aperiodic TRS in accordance with aspects of the present disclosure. The operations of method 1400 may be implemented by a UE 115 or its components as described herein. For example, the operations of method 1400 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At 1405 the UE 115 may receive, based at least in part on an occurrence of a triggering event associated with the UE, a trigger signal that identifies resources to be used for transmission of an aperiodic TRS. The operations of 1405 may be performed according to the methods described herein. In certain examples, aspects of the operations of 1405 may be performed by a triggering event manager as described with reference to FIGS. 9 through 12. In some aspects, the identified resources for the aperiodic TRS may be identified on, or otherwise associated with the event target (e.g., resources on a new BWP, resources on a new beam, resources on a SCell being activated, etc.). Without identifying these resources on the event target, the UE would need to wait a longer period of time to detect aperiodic TRS transmission on the target (e.g., on the newly activated SCell, on the new beam or BWP, etc.).

At 1410 the UE 115 may receive the aperiodic TRS based at least in part on the trigger signal and the identified resources. The operations of 1410 may be performed according to the methods described herein. In certain examples, aspects of the operations of 1410 may be performed by a trigger signal manager as described with reference to FIGS. 9 through 12.

At 1415 the UE 115 may perform at least one of a tracking function, or a synchronization function, or an alignment function, or a combination thereof, in response to the occurrence of the triggering event and based at least in part on the aperiodic TRS. The operations of 1415 may be performed according to the methods described herein. In certain examples, aspects of the operations of 1415 may be performed by a aperiodic TRS manager as described with reference to FIGS. 9 through 12.

Figure 15:
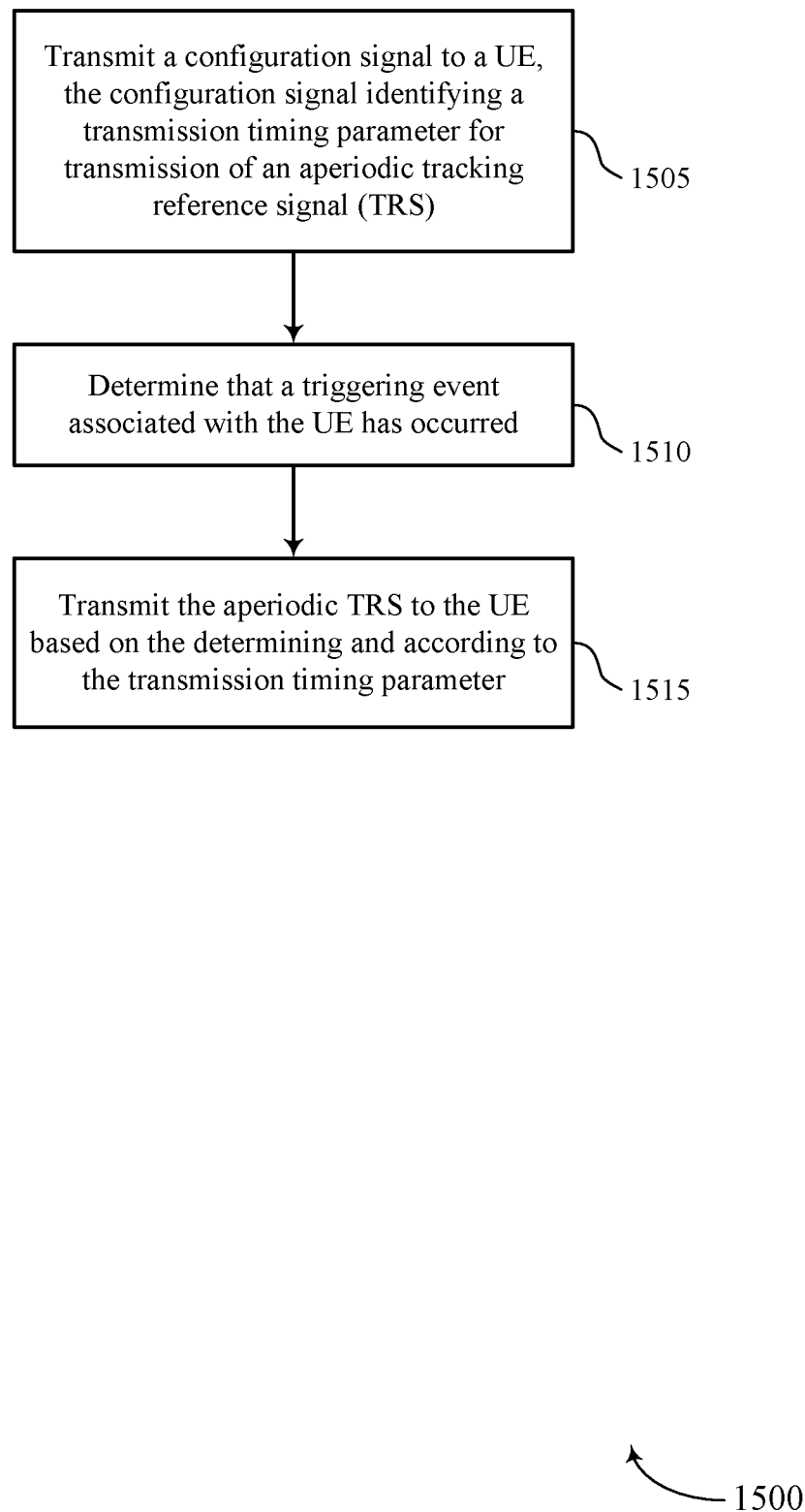

FIG. 15 shows a flowchart illustrating a method 1500 for aperiodic TRS in accordance with aspects of the present disclosure. The operations of method 1500 may be implemented by a base station 105 or its components as described herein. For example, the operations of method 1500 may be performed by a base station communications manager as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At 1505 the base station 105 may transmit a configuration signal to a UE, the configuration signal identifying a transmission timing parameter for transmission of an aperiodic TRS. The operations of 1505 may be performed according to the methods described herein. In certain examples, aspects of the operations of 1505 may be performed by a trigger signal manager as described with reference to FIGS. 5 through 8.

At 1510 the base station 105 may determine that a triggering event associated with the UE has occurred. The operations of 1510 may be performed according to the methods described herein. In certain examples, aspects of the operations of 1510 may be performed by a triggering event manager as described with reference to FIGS. 5 through 8.

At 1515 the base station 105 may transmit the aperiodic TRS to the UE based at least in part on the determining and according to the transmission timing parameter. The operations of 1515 may be performed according to the methods described herein. In certain examples, aspects of the operations of 1515 may be performed by a aperiodic TRS manager as described with reference to FIGS. 5 through 8.

Figure 16:
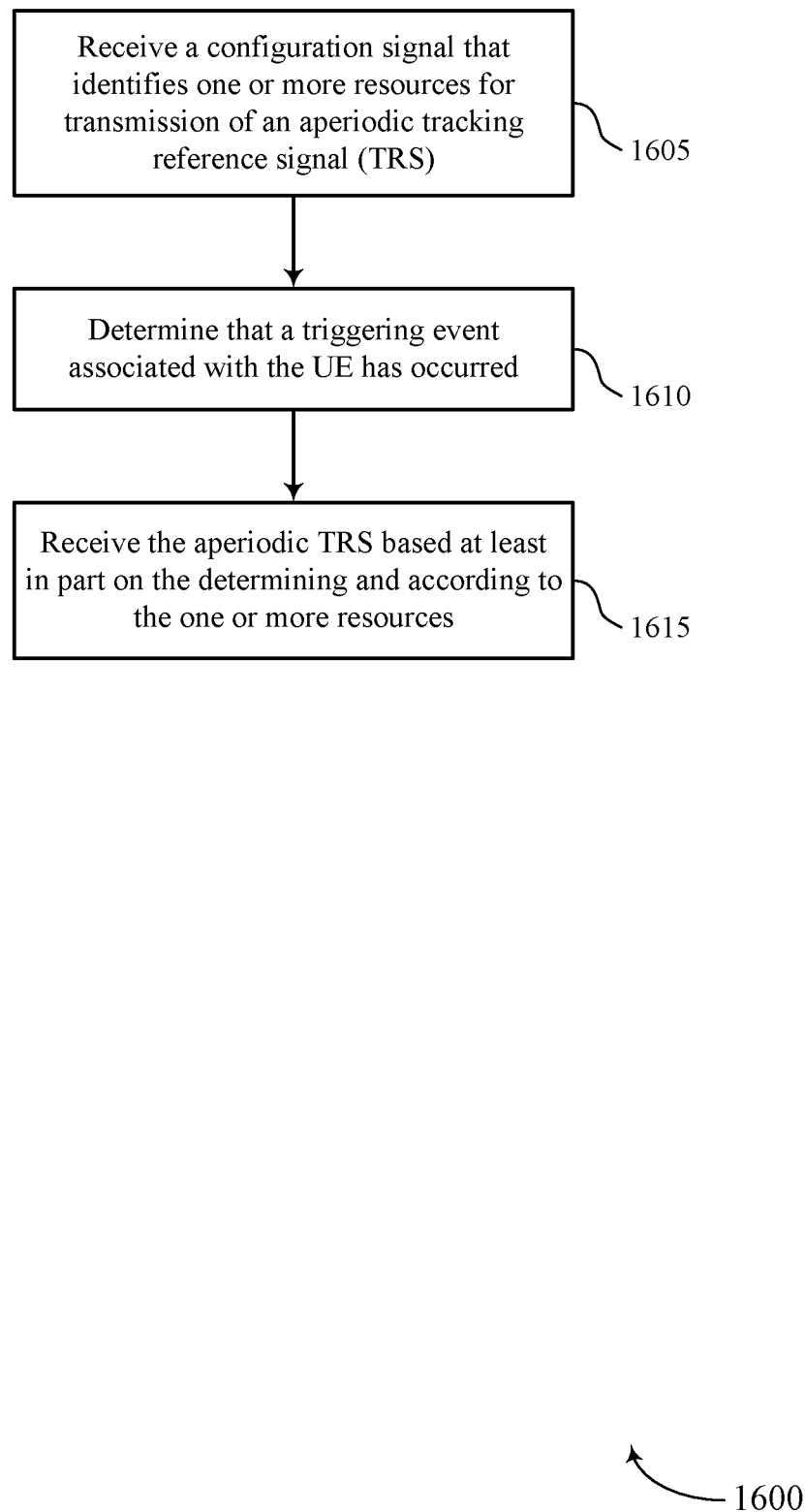

FIG. 16 shows a flowchart illustrating a method 1600 for aperiodic TRS in accordance with aspects of the present disclosure. The operations of method 1600 may be implemented by a UE 115 or its components as described herein. For example, the operations of method 1600 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At 1605 the UE 115 may receive a configuration signal that identifies one or more resources for transmission of an aperiodic TRS. The operations of 1605 may be performed according to the methods described herein. In certain examples, aspects of the operations of 1605 may be performed by a trigger signal manager as described with reference to FIGS. 9 through 12. In some aspects, the identified resources for the aperiodic TRS may be identified on, or otherwise associated with the event target (e.g., resources on a new BWP, resources on a new beam, resources on a SCell being activated, etc.). Without identifying these resources on the event target, the UE would need to wait a longer period of time to detect aperiodic TRS transmission on the target (e.g., on the newly activated SCell, on the new beam or BWP, etc.).

At 1610 the UE 115 may determine that a triggering event associated with the UE has occurred. The operations of 1610 may be performed according to the methods described herein. In certain examples, aspects of the operations of 1610 may be performed by a triggering event manager as described with reference to FIGS. 9 through 12.

At 1615 the UE 115 may receive the aperiodic TRS based at least in part on the determining and according to the one or more resources. The operations of 1615 may be performed according to the methods described herein. In certain examples, aspects of the operations of 1615 may be performed by a aperiodic TRS manager as described with reference to FIGS. 9 through 12.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving, based at least in part on an occurrence of a triggering event associated with at least a secondary cell activation for the UE, a trigger signal that identifies resources to be used for transmission of an aperiodic tracking reference signal (TRS) and triggering the secondary cell activation for the UE;
   receiving the aperiodic TRS based at least in part on the trigger signal and the identified resources; and
   performing at least one of a tracking function, or a synchronization function, or an alignment function, or a combination thereof, in response to the occurrence of the triggering event and based at least in part on the aperiodic TRS.

2. The method of claim 1, wherein the aperiodic TRS comprises a channel state information reference signal (CSI-RS) for tracking that is separate from an aperiodic CSI-RS for channel estimation.

3. The method of claim 1, wherein the triggering event comprises at least one of the secondary cell activation, or a bandwidth part switching event, or a beam change event, or a connected mode discontinuous reception event, or an idle mode discontinuous reception event, or a combination thereof.

4. The method of claim 1, wherein the triggering event comprises the secondary cell activation, further comprising:
   receiving the trigger signal from an active cell of the UE; and
   receiving the aperiodic TRS from the secondary cell being activated in the secondary cell activation, wherein the resources identified in the trigger signal comprise secondary cell resources used for transmission of the aperiodic TRS.

5. The method of claim 1, wherein the triggering event comprises a bandwidth part switching event, further comprising:
   receiving the trigger signal over an active bandwidth part of the UE; and
   receiving the aperiodic TRS over a bandwidth part being activated in the bandwidth part switching event, wherein the activated bandwidth part is different from the active bandwidth part and wherein the resources identified in the trigger signal comprise activated bandwidth part resources used for transmission of the aperiodic TRS over the activated bandwidth part.

6. The method of claim 1, wherein the triggering event comprises a beam change event, further comprising:
   receiving the trigger signal over an active beam of the UE; and
   receiving the aperiodic TRS over a beam being activated in the beam change event, wherein the activated beam is different from the active beam and wherein the resources identified in the trigger signal comprise activated beam resources used for transmission of the aperiodic TRS over the activated beam.

7. The method of claim 1, wherein the trigger signal is received in a medium access control (MAC) control element (CE).

8. The method of claim 7, further comprising:
   determining that a secondary cell has been activated based at least in part on the MAC CE.

9. The method of claim 8, wherein the aperiodic TRS is received a defined waiting period after the MAC CE.

10. The method of claim 1, further comprising:
    determining that a beam change event has occurred based at least in part on the MAC CE.

11. The method of claim 1, wherein the trigger signal is received in a downlink control indicator (DCI).

12. The method of claim 11, wherein the trigger signal carries at least one of a field indicating that the aperiodic TRS is triggered or a field indicating the triggering event, wherein the indication of the triggering event comprises the indication that the aperiodic TRS is triggered.

13. The method of claim 11, wherein the triggering event comprises at least one of a secondary cell activation event, or a bandwidth part switching event, or a beam change event, or a connected mode discontinuous reception event, or an idle mode discontinuous reception event, or a combination thereof.

14. The method of claim 11, further comprising:
    receiving a synchronization signal block (SSB) transmission prior to the triggering event occurring.

15. The method of claim 11, further comprising:
    receiving an uplink grant DCI that identifies the resources to be used for transmission of the aperiodic TRS.

16. The method of claim 15, further comprising:
decoding the uplink grant DCI to identify additional resources to be used for transmission of a channel state information reference signal.

17. The method of claim 11, further comprising:
receiving a downlink grant DCI that identifies the resources to be used for the aperiodic TRS.

18. The method of claim 17, further comprising:
decoding a first portion of bits of a downlink grant field of the downlink grant DCI to identify a zero grant or invalid grant; and
decoding a second portion bits of a second field to identify the indication that the aperiodic TRS has been triggered, the second field being different from the first portion of bits of the downlink grant field.

19. The method of claim 18, wherein the bits of the second field indicates that the triggering event has occurred, and the indication of the triggering event further indicates that the aperiodic TRS is triggered.

20. The method of claim 11, further comprising:
receiving the DCI in a same slot as the aperiodic TRS is received in.

21. The method of claim 11, further comprising:
receiving the DCI in a different slot from slot that the aperiodic TRS is received in.

22. The method of claim 11, wherein the DCI comprises at least one of a fallback DCI format or a non-fallback DCI format.

23. The method of claim 11, wherein the DCI comprises an indication of a transmission timing parameter associated with the aperiodic TRS.

24. An apparatus for wireless communication at a user equipment (UE), comprising: a processor, memory in electronic communication with the processor; and instructions stored in the memory and executable by the processor to cause the apparatus to:
receive, based at least in part on an occurrence of a triggering event associated with at least a secondary cell activation for the UE, a trigger signal that identifies resources to be used for transmission of an aperiodic tracking reference signal (TRS) and triggering the secondary cell activation for the UE;
receive the aperiodic TRS based at least in part on the trigger signal and the identified resources; and
perform at least one of a tracking function, or a synchronization function, or an alignment function, or a combination thereof, in response to the occurrence of the triggering event and based at least in part on the aperiodic TRS.

25. The apparatus of claim 24, wherein the aperiodic TRS comprises a channel state information reference signal (CSI-RS) for tracking that is separate from an aperiodic CSI-RS for channel estimation.

26. The apparatus of claim 24, wherein the trigger signal is received in a downlink control indicator (DCI).

27. The apparatus of claim 26, wherein the trigger signal carries at least one of a field indicating that the aperiodic TRS is triggered or a field indicating the triggering event, wherein the indication of the triggering event comprises the indication that the aperiodic TRS is triggered.

28. The apparatus of claim 26, wherein the triggering event comprises at least one of the secondary cell activation, or a bandwidth part switching event, or a beam change event, or a connected mode discontinuous reception event, or an idle mode discontinuous reception event, or a combination thereof.

29. The apparatus of claim 26, wherein the instructions are further executable by the processor to cause the apparatus to:
receive a synchronization signal block (SSB) transmission prior to the triggering event occurring.

30. The apparatus of claim 26, wherein the instructions are further executable by the processor to cause the apparatus to:
receive an uplink grant DCI that identifies the resources to be used for transmission of the aperiodic TRS.

31. The apparatus of claim 30, wherein the instructions are further executable by the processor to cause the apparatus to:
decode the uplink grant DCI to identify additional resources to be used for transmission of a channel state information reference signal.

32. The apparatus of claim 26, wherein the instructions are further executable by the processor to cause the apparatus to:
receive a downlink grant DCI that identifies the resources to be used for the aperiodic TRS.

33. The apparatus of claim 32, wherein the instructions are further executable by the processor to cause the apparatus to:
decode a first portion of bits of a downlink grant field of the downlink grant DCI to identify a zero grant or invalid grant; and
decode a second portion bits of a second field to identify the indication that the aperiodic TRS has been triggered, the second field being different from the first portion of bits of the downlink grant field.

34. The apparatus of claim 33, wherein the bits of the second field indicates that the triggering event has occurred, and the indication of the triggering event further indicates that the aperiodic TRS is triggered.

35. The apparatus of claim 26, wherein the instructions are further executable by the processor to cause the apparatus to:
receive the DCI in a same slot as the aperiodic TRS is received in.

36. The apparatus of claim 26, wherein the instructions are further executable by the processor to cause the apparatus to:
receive the DCI in a different slot from slot that the aperiodic TRS is received in.

37. The apparatus of claim 26, wherein the DCI comprises at least one of a fallback DCI format or a non-fallback DCI format.

38. The apparatus of claim 26, wherein the DCI comprises an indication of a transmission timing parameter associated with the aperiodic TRS.

39. The apparatus of claim 24, wherein the trigger signal is received in a medium access control (MAC) control element (CE).

40. The apparatus of claim 39, wherein the instructions are further executable by the processor to cause the apparatus to:
determine that a secondary cell has been activated based at least in part on the MAC CE.

41. The apparatus of claim 40, wherein the aperiodic TRS is received a defined waiting period after the MAC CE.

42. An apparatus for wireless communication at a user equipment (UE), comprising:
means for receiving, based at least in part on an occurrence of a triggering event associated with at least a secondary cell activation for the UE, a trigger signal that identifies resources to be used for transmission of an aperiodic tracking reference signal (TRS) and triggering the secondary cell activation for the UE;

means for receiving the aperiodic TRS based at least in part on the trigger signal and the identified resources; and means for performing at least one of a tracking function, or a synchronization function, or an alignment function, or a combination thereof, in response to the occurrence of the triggering event and based at least in part on the aperiodic TRS.

43. The apparatus of claim 42, wherein the aperiodic TRS comprises a channel state information reference signal (CSI-RS) for tracking that is separate from an aperiodic CSI-RS for channel estimation.

44. The apparatus of claim 42, wherein the triggering event comprises at least one of the secondary cell activation, or a bandwidth part switching event, or a beam change event, or a connected mode discontinuous reception event, or an idle mode discontinuous reception event, or a combination thereof.

45. The apparatus of claim 42, wherein the triggering event comprises the secondary cell activation, further comprising:

means for receiving the trigger signal from an active cell of the UE; and means for receiving the aperiodic TRS from the secondary cell being activated in the secondary cell activation, wherein the resources identified in the trigger signal comprise secondary cell resources used for transmission of the aperiodic TRS.

46. A non-transitory computer-readable medium storing code for wireless communication at a user equipment (UE), the code comprising instructions executable by a processor to:

receive, based at least in part on an occurrence of a triggering event associated with at least a secondary cell activation for the UE, a trigger signal that identifies resources to be used for transmission of an aperiodic tracking reference signal (TRS) and triggering the secondary cell activation for the UE;

receive the aperiodic TRS based at least in part on the trigger signal and the identified resources; and perform at least one of a tracking function, or a synchronization function, or an alignment function, or a combination thereof, in response to the occurrence of the triggering event and based at least in part on the aperiodic TRS.

47. The non-transitory computer-readable medium of claim 46, wherein the aperiodic TRS comprises a channel state information reference signal (CSI-RS) for tracking that is separate from an aperiodic CSI-RS for channel estimation.

48. The non-transitory computer-readable medium of claim 46, wherein the triggering event comprises at least one of the secondary cell activation, or a bandwidth part switching event, or a beam change event, or a connected mode discontinuous reception event, or an idle mode discontinuous reception event, or a combination thereof.

* * * * *